United States Patent
Kawakami

(10) Patent No.: US 9,511,466 B2
(45) Date of Patent: Dec. 6, 2016

(54) FLUID PRESSURE CYLINDER AND CLAMP DEVICE

(75) Inventor: Takayuki Kawakami, Hyogo (JP)

(73) Assignee: PASCAL ENGINEERING CORPORATION, Hyogo (JP)

( * ) Notice: Subject to any disclaimer, the term of this patent is extended or adjusted under 35 U.S.C. 154(b) by 319 days.

(21) Appl. No.: 14/114,650

(22) PCT Filed: Aug. 2, 2012

(86) PCT No.: PCT/JP2012/069666
§ 371 (c)(1),
(2), (4) Date: Feb. 4, 2014

(87) PCT Pub. No.: WO2013/051333
PCT Pub. Date: Nov. 4, 2013

(65) Prior Publication Data
US 2014/0138890 A1    May 22, 2014

(30) Foreign Application Priority Data
Oct. 7, 2011    (JP) .................................. 2011-222846

(51) Int. Cl.
*B23Q 17/22* (2006.01)
*F15B 15/28* (2006.01)
(Continued)

(52) U.S. Cl.
CPC ............... *B23Q 17/22* (2013.01); *B23Q 3/082* (2013.01); *B23Q 17/005* (2013.01); *B25B 5/062* (2013.01);
(Continued)

(58) Field of Classification Search
CPC ......... B23Q 17/22; B23Q 3/082; B23Q 1/009; F15B 15/2815; F15B 11/072; F15B 15/225; B25B 5/062
(Continued)

(56) References Cited

U.S. PATENT DOCUMENTS 3,463,055 A    8/1969    Bayles
3,530,896 A    9/1970    Whiteman
(Continued)

FOREIGN PATENT DOCUMENTS

JP    53-144284    11/1978
JP    55-59802     4/1980
(Continued)

OTHER PUBLICATIONS www.Pascaleng.co.jp; Sensing Swing clamp; model CTM; Double Acting 7MPa; pp. 1-39.*
(Continued)

*Primary Examiner* — Monica Carter
*Assistant Examiner* — Mahdi H Nejad
(74) *Attorney, Agent, or Firm* — Norris McLaughlin & Marcus, P.A.

(57) ABSTRACT

A fluid pressure cylinder and a clamp device that, when an output member arrives at a prescribed position such as, in particular, an advance limit position or a retraction limit position, are capable of detecting the position of the output member on the basis of change of air pressure as, due to an opening/closing valve mechanism, the communication state of an air passage within the clamp main body is changed over together with the operation of the output member.

8 Claims, 20 Drawing Sheets

(51) Int. Cl.
*B23Q 3/08* (2006.01)
*B23Q 17/00* (2006.01)
*B25B 5/06* (2006.01)
*F15B 11/072* (2006.01)
*F15B 15/22* (2006.01)
*B23Q 1/70* (2006.01)

(52) U.S. Cl.
CPC ........... *F15B 11/072* (2013.01); *F15B 15/225* (2013.01); *F15B 15/2807* (2013.01); *F15B 15/2815* (2013.01); *B23Q 1/70* (2013.01)

(58) Field of Classification Search
USPC .................................................. 269/27; 91/1
See application file for complete search history.

(56) References Cited

U.S. PATENT DOCUMENTS

| | | | | |
|---|---|---|---|---|
| 4,099,450 | A * | 7/1978 | Mase | B23Q 5/26 83/617 |
| 5,095,702 | A * | 3/1992 | Volz | B60T 8/38 303/113.4 |
| 5,620,024 | A * | 4/1997 | Yonezawa | F15B 11/028 137/554 |
| 6,736,384 | B2 | 5/2004 | Yokota | |
| 8,523,155 | B2 * | 9/2013 | Kuroda | F16L 39/04 137/614 |
| 9,033,323 | B2 * | 5/2015 | Kawakami | B23Q 1/009 269/24 |
| 2003/0151183 | A1 | 8/2003 | Yokota | |
| 2009/0152784 | A1 * | 6/2009 | Yonezawa | B25B 5/062 269/32 |
| 2010/0038179 | A1 * | 2/2010 | Kimura | F16F 9/3278 184/24 |
| 2012/0098180 | A1 * | 4/2012 | Kawakami | B23Q 1/009 269/20 |
| 2013/0042443 | A1 * | 2/2013 | Kawakami | B23Q 1/009 24/456 |
| 2013/0113146 | A1 * | 5/2013 | Kawakami | B23Q 3/082 269/25 |
| 2015/0285280 | A1 * | 10/2015 | Kawakami | B25B 5/062 91/418 |

FOREIGN PATENT DOCUMENTS

| | | | |
|---|---|---|---|
| JP | 60-129410 | | 7/1985 |
| JP | 60129410 | * | 7/1985 |
| JP | S60129410 | * | 7/1985 |
| JP | S60129410 A | * | 7/1985 |
| JP | 2001-087991 | | 4/2001 |
| JP | 2003-305626 | | 10/2003 |
| JP | 10 2005 052 780 | | 5/2007 |
| JP | 2008304065 | * | 12/2008 |
| JP | 2009-072891 | | 4/2009 |
| JP | 2009-125821 | | 6/2009 |
| JP | 2 177 309 | | 4/2010 |
| JP | 2011-002041 | | 1/2011 |
| JP | 2012051103 | * | 3/2012 |

OTHER PUBLICATIONS www.Pascaleng.co.jp; Air Swing clamp; model CTX and CTH; Double Acting; pp. 276-285.*
www.Pascaleng.co.jp; Air Swing clamp; 3 point sensor model; model CTX-T; Double Acting 1MPa; pp. 645-663.*
www.Pascaleng.co.jp; Sensing Air Link Clamp—model CLX-T.*

* cited by examiner

FLUID PRESSURE CYLINDER AND CLAMP DEVICE

TECHNICAL FIELD

The present invention relates to a fluid pressure cylinder and to a clamp device that, when an output member arrives at a prescribed position such as, in particular, an advance limit position or a retraction limit position, are capable of detecting the position of the output member on the basis of change of air pressure as, due to an opening/closing valve mechanism, the communication state of an air passage within the cylinder main body is changed over together with the operation of the output member.

BACKGROUND OF THE INVENTION

In the prior art, a fluid pressure cylinder that is employed in a clamp device or the like that clamps an object to be clamped, such as a workpiece that is to be supplied to machining, has been provided with a cylinder main body, an output member that is fitted in the cylinder main body so as to move freely forward and backward, and a fluid chamber that drives the output member to either advance or retract.

Now, various rod position detection techniques have been implemented in practice for detecting a prescribed position of the output member of the fluid pressure cylinder along its axial direction (this position may be an advanced limit position, a retracted limit position, an intermediate position, or the like).

For example, the clamp device of Patent Document #1 detects the position of a piston rod with a pressure sensor that detects the fluid pressure supplied to a fluid pressure cylinder, and a two position sensor that detects an elevated position and a lowered position of a detection portion of the lower end portion of an actuation rod that projects from a piston member of the fluid pressure cylinder to the exterior.

In the clamp device of Patent Document #2, a mechanism is provided that opens and closes an air passage together with raising and lowering action of an output rod of a fluid pressure cylinder, and thus it is arranged for it to be possible to detect the raised position and the lowered position of the output rod.

In the clamp device of Patent Document #3, a workpiece support stand that receives and holds the subject to be clamped is provided independently. The workpiece support stand includes a pad member in which an air ejection outlet is formed, and an outer barrel member that elastically supports the pad member toward the object to be clamped. Pressurized air is ejected from the air ejection outlet when the pad member is in the projected position, and, when the clamp device is driven for clamping and the pad member is pressed by the object to be clamped and retracts, the air ejection outlet is blocked by the outer barrel member and the pressure of the pressurized air rises, so that it is possible to detect that the clamped state has been established.

Patent Document #1: Japanese Laid Open Pat. Publication 2001-87991;
Patent Document #2: Japanese Laid Open Pat. Publication 2003-305626;
Patent Document #3: Japanese Laid Open Pat. Publication 2009-125821.

With the clamp device of Patent Document #1, since the actuation rod is projected to the exterior from the piston member of the fluid pressure cylinder, and the raised position and the lowered position of the detection portion provided on the lower end portion of the actuation rod are detected by the two position sensor, accordingly it is necessary to provide a detection space below the fluid pressure cylinder to allow shifting of the detection portion and for installation of the position sensor, so that there is the problem that the clamp device (i.e. the fluid pressure cylinder) is increased in size.

With the clamp device of Patent Document #2, the mechanism that detects the raised position and the lowered position of the output rod is provided outside the clamp main body. Due to this, in a similar manner to the case with the clamp device of Patent Document #1, it is not possible to make the clamp device compact, since it is necessary to provide a detection space external to the clamp main body. Moreover, since in this structure a detection element that opens and closes the air passage is shifted so as to slide freely with respect to a detection orifice, there is a fear that, when used over the long term, the air passage may become blocked and the performance may decrease.

And since, during the unclamped state, the air ejection outlet of the workpiece support stand of the clamp device of Patent Document #3 opens at a location in the neighborhood of the clamp device and of the object to be clamped, there is a fear that swarf resulting from machining or coolant (i.e. cutting liquid) may enter into the air ejection outlet and block it.

The objects of the present invention include: to provide a fluid pressure cylinder and clamp device that can be made more compact while being capable of reliably detecting, on the basis of pressure change of air pressure in an air passage within a cylinder main body, that an output member has arrived at a prescribed position; and to provide a fluid pressure cylinder and clamp device that provide enhanced reliability and durability for detection of a prescribed position of an output member.

SUMMARY OF THE INVENTION

The fluid pressure cylinder has a cylinder main body, an output member that is fitted so as to be movable forward and backward within the cylinder main body, and a fluid chamber for driving the output member to either advance or retract, characterized in that: there are provided with an air passage that is formed within the cylinder main body with pressurized air being supplied to its one end portion while its other end portion is communicated to an exterior, and an opening/closing valve mechanism capable of opening and closing the air passage; wherein the opening/closing valve mechanism comprises a valve body that is installed in an installation hole formed in the cylinder main body so as to be movable forward and backward and an end portion of which projects into the fluid chamber, a valve seat against which the valve body can contact, a fluid pressure introduction chamber that keeps the valve body in a advanced state toward the output member by means of fluid pressure in the fluid chamber, and a fluid pressure introduction passage that communicates together the fluid chamber and the fluid pressure introduction chamber; and wherein, by means of changing over the open or closed state of the opening/closing valve mechanism by the valve body being shifted by the output member when the output member arrives at a prescribed position, it is possible to detect that the output member has arrived at the prescribed position on the basis of the pressure of the air in the air passage.

In the state in which fluid pressure is supplied to the fluid chamber, the opening/closing valve mechanism maintains the valve open state in which the valve body is removed away from the valve seat, and when the fluid pressure in the fluid chamber is changed over to drain pressure and also the output member has arrived at the prescribed position, the opening/closing valve mechanism changes over to the valve closed state in which the valve body is contacted against the valve seat.

When fluid pressure is supplied to the fluid chamber, the opening/closing valve mechanism maintains the valve closed state in which the valve body is contacted against the valve seat, and when the fluid pressure in the fluid chamber is changed over to drain pressure and also the output member has arrived at the prescribed position, the opening/closing valve mechanism changes over to the valve open state in which the valve body is removed away from the valve seat.

The opening/closing valve mechanism comprises a cap member that is inserted into an installation hole formed in the cylinder main body and is screwingly engaged thereinto and into which the valve body is inserted so as to be movable forward and backward, and the valve seat is formed on the cap member in an end portion thereof towards the output member, and the fluid pressure introduction chamber is defined between the cap member and the valve body.

The valve body comprises a valve body main portion and a movable valve body that is installed with being fitted over the valve body main portion capable of approaching toward and removing away from the valve seat, and a seal member is provided between the valve body main portion and the movable valve body.

The fluid pressure introduction passage of the opening/closing valve mechanism is formed so as to pierce the valve body.

The opening/closing valve mechanism comprises an elastic member that elastically biases the valve body towards the output member.

The prescribed position of the output member is one of a raised limit position, an intermediate operating position, and a lowered limit position.

A clamp device comprises a clamp rod constituted with the output member which is driven by the fluid pressure cylinder.

By providing the opening/closing valve mechanism that opens and closes the air passage within the cylinder main body, by this opening/closing valve mechanism including the valve body, the valve seat, the fluid pressure introduction chamber, and the fluid pressure introduction passage, and by installing the valve body in the installation hole formed in the cylinder main body, it is possible to install the opening/closing valve mechanism within the clamp main body, and thus it is possible to make the fluid pressure cylinder more compact.

It is arranged so that it is possible to introduce the fluid pressure in the fluid chamber of the fluid pressure cylinder into the fluid pressure introduction chamber of the opening/closing valve mechanism via the fluid pressure introduction passage, and therefore, in the state in which the output member has not arrived at its prescribed position, it is possible to keep the valve body in the state of projecting towards the fluid chamber by utilizing the fluid pressure in the fluid chamber, and it is thus possible to maintain the open or closed state of the opening/closing valve mechanism. Since the fluid pressure in the fluid chamber is utilized for biasing the valve body, this is accordingly advantageous from the point of view of reliability and durability. Since, when the output member arrives at its prescribed position, the valve body is shifted by the output member and the open or closed state of the opening/closing valve mechanism is reliably changed over, accordingly it is possible reliably to detect the prescribed position of the output member on the basis of the air pressure in the air passage.

It is possible to detect the fact that the output member has arrived at its prescribed position on the basis of the air pressure that has changed according to changing of the communicating state of the air passage to shutting state of the air passage.

It is possible to detect the fact that the output member has arrived at its prescribed position on the basis of the air pressure that has changed according, to changing of the communicating state of the air passage to shutting state of the air passage.

It is possible to install the opening/closing valve mechanism within the cylinder main body in a compact manner.

It is possible to make the valve member shift follow the shifting of the main body portion, since frictional force is generated by the seal member between the main body portion and the valve member when the main body portion shifts.

It is not necessary to form the fluid pressure introduction passage in the ramp cylinder main body, so that it is possible to make the opening/closing valve mechanism in a compact manner.

It is possible to maintain the opening/closing valve mechanism in the open state or in the closed state when the fluid pressure in the fluid chamber is changed over to drain pressure, until the output member arrives at its prescribed position.

It is possible reliably to detect that the output member has reached one of the upper limit position, the intermediate operating position, and the lowered limit position.

Beneficial effects are obtained for a clamp device of the type in which a clamp rod is driven by a fluid pressure cylinder.

DESCRIPTION OF THE PREFERRED EMBODIMENTS

Figure 1:
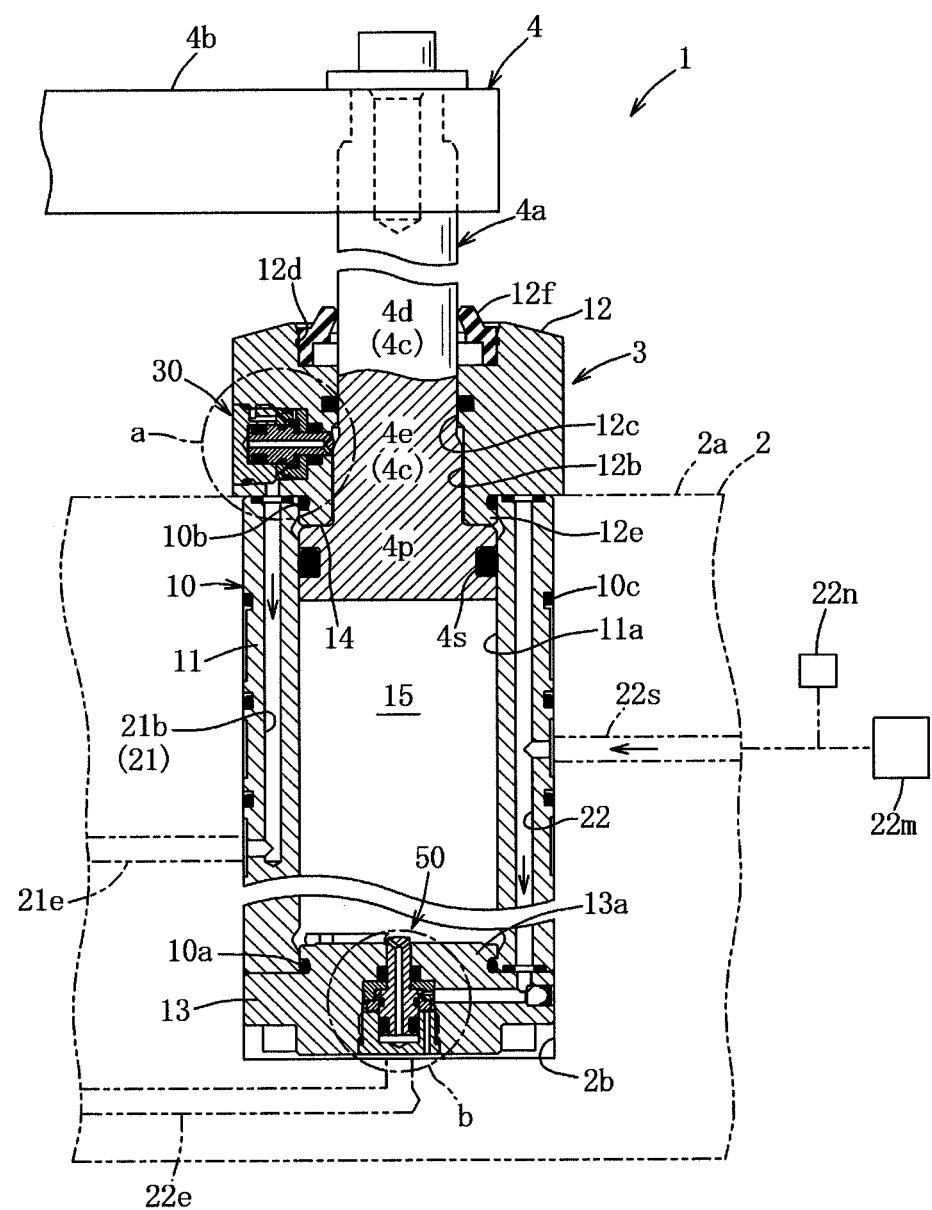
FIG. 1 is a sectional view of a clamp device (the unclamped state) according to a first embodiment of the present invention.

In the following, the best mode for implementation of the present invention will be explained on various embodiments.

These embodiments are examples of cases in which the present invention is applied to a clamp device that is constituted so as to drive an output member (i.e. a clamp rod) with a hydraulic pressure cylinder as a fluid pressure cylinder.

Embodiment 1

First, the overall structure of the clamp device will be explained.

As shown in FIGS. 1 through 10, a clamp device 1 is mounted to and projects upwards from a base member 2 such as a pallet or the like. The clamp device 1 is a device for fixing objects to be clamped, such as a workpiece, detachably on a fixing surface 2a of the base member 2. In the following, "hydraulic pressure" (i.e. fluid pressure) means oil in the compressed state.

The clamp device 1 comprises a hydraulic pressure cylinder 3 (i.e. a fluid pressure cylinder) that is mounted in a vertical attitude, an output member 4, first and second air passages 21, 22 formed in a cylinder main body 10 of the hydraulic pressure cylinder 3, to the one end portion of which pressurized air is supplied while their other end portion communicates to the exterior, and first and second opening/closing valve mechanisms 30, 50 that are capable of opening and closing these first and second air passages 21, 22 respectively.

The first opening/closing valve mechanism 30 is a device for detecting, on the basis of the air pressure in the first air passage 21, that the output member 4 is at its raised limit position. And the second opening/closing valve mechanism 50 is a device for detecting, on the basis of the air pressure in the second air passage 22, that the output member 4 is at its lowered limit position. It should be understood that the raised limit position of the output member 4 corresponds to the "prescribed position of the output member". In a similar manner, the lowered limit position of the output member 4 corresponds to the "other prescribed position of the output member.

Next, the cylinder main body 10 will be explained.

As shown in FIGS. 1, 4, 6, and 8, the cylinder main body 10 comprises a cylinder member 11, an upper end wall member 12 that is fixed at the upper end of the cylinder member 11, a lower end wall member 13 that is fixed at the lower end of the cylinder member 11, and so on. A fitting aperture 2b is formed in the base member 2 and has its upper end in the opened state, and the cylinder member 11 and the lower wall end member 13 of the cylinder main body 10 are fitted into this fitting aperture 2b. A portion of the lower end surface of the upper end wall member 12 is contacted against a fixing surface 2a, and the upper end wall member 12 is fixed to the base member 2 by a plurality of bolts (for example, four) that are passed through a plurality of bolt holes 12a.

A through hole, through which the output member 4 is passed, is formed in the upper end wall member 12, and this through hole includes a first lower portion through hole 12b formed in the lower portion and a second through hole 12c in the upper portion, with the second through hole 12c having a smaller diameter than that of the first through hole 12b. An annular seal fitting concave portion 12d is formed at the upper end portion of the second through hole 12c. A cylinder bore 11a is formed in the cylinder member 11 so as to extend downward from the lower end of the first through hole 12b, and has a larger diameter than that of the first through hole 12b. A tubular portion 12e at the lower end portion of the upper end wall member 12 is fitted into the upper end portion of the cylinder hole 11a; a projecting portion 13a at the upper end portion of the lower end wall member 13 are fitted into the lower end portion of the cylinder hole 11a; and each of the upper end wall member 12 and the lower end wall member 13 is fixed to the cylinder member 11 by a plurality of bolts (for example, six).

Next, the output member 4 will be explained.

As shown in FIGS. 1, 4, 6, and 8, the output member 4 is a clamp rod of the clamp device 1 (in other words, a piston rod member 4a). One end portion of a clamp arm 4b that extends in a horizontal orientation is fixed to the upper end portion of the output member 4. The piston rod member 4a is fitted so as to be capable of movement forward and backward in its axial direction. The piston rod member 4a comprises a piston rod portion 4c and a piston portion 4p that is fixed to the lower end portion thereof.

The piston rod portion 4c comprises a small diameter rod portion 4d that is fitted in the second through hole 12c so as to slide freely therein in a fluid tight manner, and a large diameter rod portion 4e that continues from the lower end of the small diameter rod portion 4d and is inserted into the first through hole 12b with a small annular clearance being present between them. The piston portion 4p is fitted into the cylinder bore 11a so as to slide freely therein in a fluid tight manner. A portion of the small diameter rod portion 4d projects upward from the cylinder main body 10. The clamp arm 4b is fixed by a bolt to the upper end portion of the small diameter rod portion 4d. It should be understood that, for the clamp arm 4b, a member is used having a size (in particular, the thickness in the vertical direction) according to the thickness of the object to be clamped.

When the piston rod member 4a has arrived at its raised limit position (i.e. the unclamp position) (refer to FIG. 1), the piston portion 4p contacts against the lower surface of the upper end wall member 12, and the large diameter rod portion 4e comes to be in the inserted state into the first through hole 12b. And, when the piston rod member 4a has arrived at its lowered limit position (i.e. the clamp position) (refer to FIG. 8), the piston portion 4p comes to be in the contacting state against the upper surface of the lower end wall member 13. Seal members 10a through 10c for fluid tight sealing are provided to the cylinder main body 10, and a seal member 4s is fitted around the external circumferential portion of the piston portion 4p. Moreover, an annular dust seal 12f is fitted in the seal fitting concave portion 12d, and contacts against the external circumferential surface of the small diameter rod portion 4d.

An annular clamping hydraulic chamber 14 above the piston portion 4p and an unclamping hydraulic chamber 15 below the piston portion 4p are provided within the cylinder main body 10, and the clamping hydraulic chamber 14 has a cylindrical portion 14a, which is a tubular hydraulic chamber portion that extends into the first through hole 12b.

The clamping hydraulic chamber 14 and this unclamping hydraulic chamber 15 are connected to a hydraulic pressure supply source 5 by hydraulic passages not shown in the drawings. When hydraulic pressure is supplied to the clamping hydraulic chamber 14 and hydraulic pressure is vented from the unclamping hydraulic chamber 15, the piston rod member 4a is driven in the downwards direction for clamping, and in its lowered limit position the clamp arm 4b presses the object to be clamped against the fixing surface 2a of the base member 2, so that the clamped state is established. Conversely, when hydraulic pressure is supplied to the unclamping hydraulic chamber 15 and hydraulic pressure is vented from the clamping hydraulic chamber 14, the piston rod member 4a is driven in the upwards direction for unclamping.

Next, the first air passage 21 will be explained.

As shown in FIGS. 1, 4, 6, and 8, the first air passage 21 comprises an upstream side air passage 21a and a downstream side air passage 21b that is connected to the upstream side air passage 21a via a first opening/closing valve mechanism 30 that will be described hereinafter. The upstream end of the upstream side air passage 21a is connected to a first air supply passage 21s that is formed in the base member 2, while the downstream end of the downstream side air passage 21b is connected to a first air discharge passage 21e that is formed in the base member 2.

The upstream side air passage 21a comprises a vertical air passage that is formed in the cylinder member 11 and in the interior of the upper end wall member 12, and a horizontal air passage that is formed in the interior of the upper end wall member 12. And the downstream side air passage 21b is formed in the cylinder member 11 and in the interior of the upper end wall member 12.

Next, the second air passage 22 will be explained.

As shown in FIGS. 1, 4, 6, and 8, the upstream end of the second air passage 22 is connected to a second air supply passage 22s that is formed in the base member 2, while the downstream end of the second air passage 22 is connected, via the abovementioned fitting aperture 2b, to a second air discharge passage 22e that is formed in the base member 2. The second opening/closing valve mechanism 50 is connected to the downstream end portion of the second air passage 22. The second air passage 22 comprises a vertical air passage that is formed in the cylinder member 11 and in the interior of the lower end wall member 13, and a horizontal air passage that is formed in the interior of the lower end wall member 13.

The first and second air supply passages 21s, 22s are connected to pressurized air supply sources 21m, 22m respectively, and first and second pressure switches 21n, 22n or pressure sensors are respectively connected part way along the first and second air supply passages 21s, 22s. The first and second pressure switches 21n, 22n are changed over from OFF to ON (or from ON to OFF) when the pressure of the pressurized air in the respective air supply passages 21s, 22s rises to or above a set pressure value. The first and second air discharge passages 21e, 22e open to the exterior.

Figure 2:
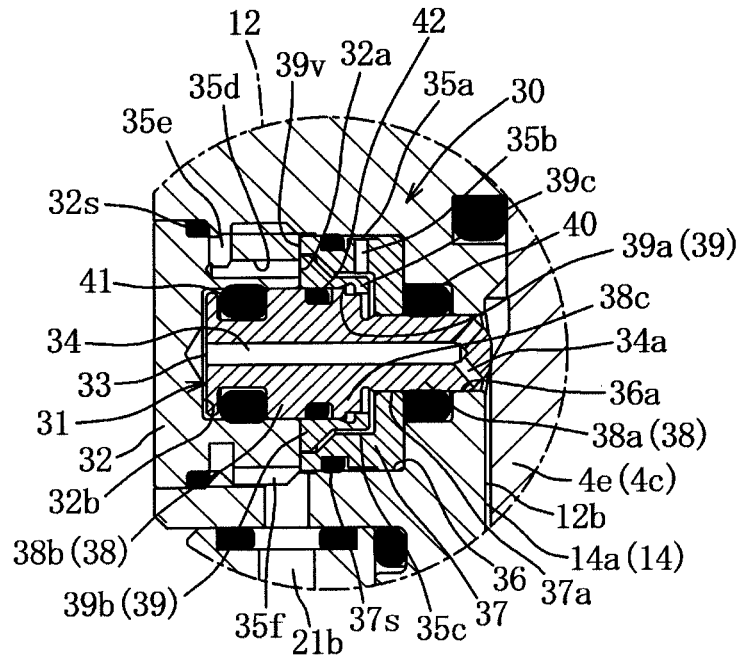
FIG. 2 is an enlarged view of a portion "a" of FIG. 1.
Figure 7:
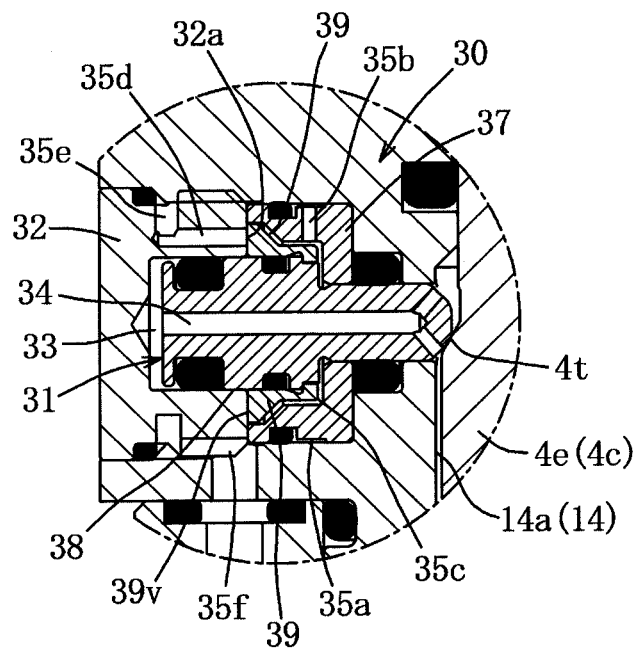
FIG. 7 is an enlarged view of a portion "c" of FIG. 4.
Figure 8:
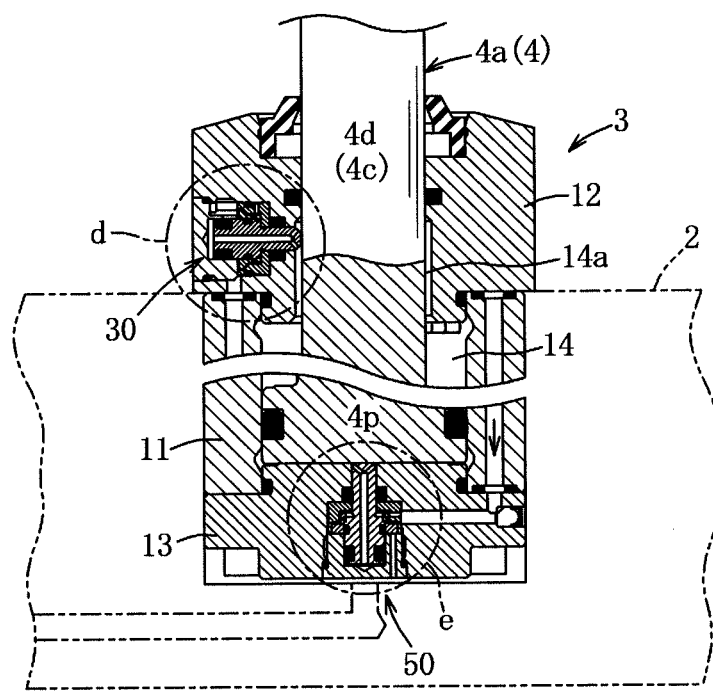
FIG. 8 is a sectional view of essential portions of the clamp device (the clamped state) according to the first embodiment.
Figure 9:
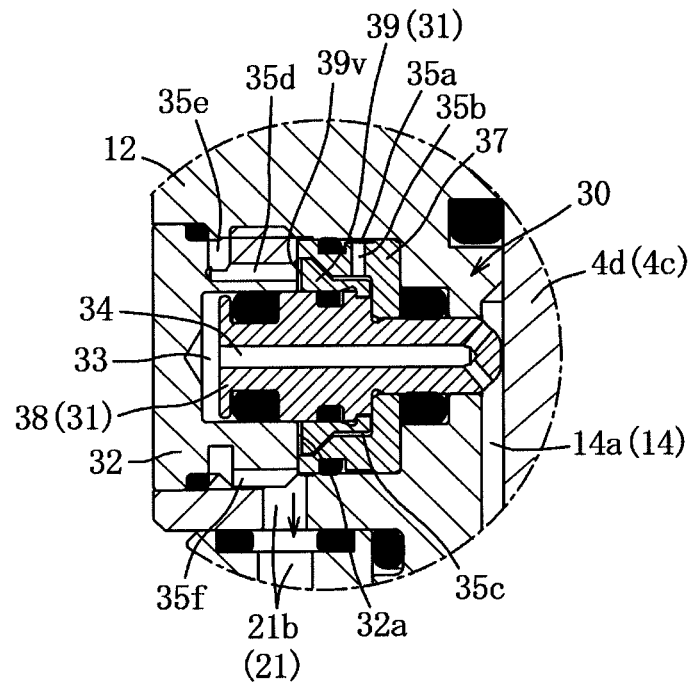
FIG. 9 is an enlarged view of a portion "d" of FIG. 8.

Next, the first opening/closing valve mechanism 30 will be explained. As shown in FIGS. 2, 7, and 9, the first opening/closing valve mechanism 30 is disposed in the interior of the wall portion of the upper end wall member 12, in the vicinity of the external circumferential surface of the upper end portion of the first through hole 12b, and is provided so as to be capable of opening and closing the downstream end portion of the upstream side air passage 21a of the first air passage 21. The first opening/closing valve mechanism 30 comprises a valve body 31, a cap member 32, a valve seat 32a, a hydraulic pressure introduction chamber 33 (i.e. a fluid pressure introduction chamber), a hydraulic pressure introduction passage 34 (i.e. a fluid pressure introduction passage), and internal air passages 35a through 35f, and is installed in an installation aperture 36 of the upper end wall member 12, via the cap member 32 and an annular member 37.

The installation hole 36 is formed so as to pierce through the upper end wall member 12 horizontally. The annular member 37 is fixedly installed at an intermediate point of the installation hole 36, and its external periphery is sealed by a seal member 37s. The cap member 32 is fixed by screw engagement so as to close the open outer end portion of the installation hole 36, and is sealed by a seal member 32s.

A through hole 37a having the same diameter as the small diameter hole 36a of the installation hole 36 is formed in the circular wall portion of the annular member 37. And the valve body 31 is installed in a reception chamber that is defined in the interiors of the cap member 32 and the annular member 37, and in the through hole 37a and the small diameter hole 36a, so as to be shiftable in the horizontal direction.

The valve body 31 comprises a valve body main portion 38 whose end portion can partially project into the tubular portion 14a of the clamping hydraulic chamber 14, and a movable valve element 39 that is fitted over the exterior of this valve body main portion 38 so as to be movable. The valve body 31 can shift in the horizontal direction with respect to the installation hole 36 through about 10 to 2.0 mm. And the movable valve body 39 can shift in the horizontal direction with respect to the valve body main portion 38 through about 1.0 to 2.0 mm.

The valve body main portion 38 consists of a small diameter rod portion 38a and a large diameter rod portion 38b that are formed integrally. The small diameter rod portion 38a is inserted into the small diameter hole 36a and the through hole 37a, and the base end portion of the large diameter rod portion 38b is fitted into a concave recess 32b of the cap member 32 so as to slide freely therein. The movable valve body 39 is fitted over the large diameter rod portion 38b in a reception chamber that is defined between the annular member 37 and the cap member 32.

There are also provided a seal member 40 that seals the external periphery of the small diameter rod portion 38a, a seal member 41 that seals the external periphery of the large diameter rod portion 38b, and a seal member 42 that seals between the valve body main portion 38 and the movable valve body 39.

An annular air passage 35a that communicates with the upstream side air passage 21a is formed in the external circumferential portion of the annular member 37. This air passage 35a is communicated with an air passage 35b within the wall portion of the annular member 37. A cap shaped air passage 35c is formed between the annular member 37 and the movable valve body 39, and an air passage 35d is formed in the cap member 32, having a horizontal orientation and being capable of communicating with the air passage 35c. An annular air passage 35e that communicates with the air passage 35d, and an air passage 35f that communicates with the air passage 35e, and moreover communicates with the upstream end portion of the downstream side air passage 21b, are formed in the external circumferential portion of the cap member 32.

The movable valve body 39 comprises a small diameter barrel portion 39a and a tapered barrel portion 39b. The tapered barrel portion 39b has a tapered external circumferential surface. The annular valve seat 32a for opening and closing between the air passages 35c and 35d is formed on the end surface of the cap member 32. An annular valve surface 39v that can either contact against the annular valve seat 32a or be separated therefrom is formed on the end surface of the tapered barrel portion 39b of the movable valve body 39.

An annular engagement portion 39c that projects slightly toward the valve body main portion 38 is formed on the interior of the circumferential end portion of the small diameter barrel portion 39a, and this is fitted shiftably over the engagement rod portion 38c which is formed of slightly smaller diameter on the end of the large diameter rod portion 38b of the valve body main portion 38.

The hydraulic pressure introduction chamber 33 is defined between the cap member 32 and the valve body main portion 38 in the concave recess 32b, and is connected to the tubular portion 14a of the clamping hydraulic chamber 14 via the hydraulic pressure introduction passage 34, which is formed so as to penetrate the valve body main portion 38. A plurality of branch hydraulic passages 34a are formed at the end portion of the hydraulic pressure introduction passage 34. When hydraulic pressure is supplied to the clamping hydraulic chamber 14, hydraulic pressure is introduced to the hydraulic pressure introduction chamber 33 from the hydraulic pressure introduction passage 34, and this hydraulic pressure biases the valve body main portion 38 in the advance direction (i.e. towards the piston rod portion 4c).

Next, the operation of the hydraulic pressure cylinder 3 with the first opening/closing valve mechanism 30 will be explained.

When hydraulic pressure is supplied to the clamping hydraulic chamber 14, and the piston rod member 4a is in an intermediate lowered position or the limiting lowered position (i.e. in the clamped state), the small diameter rod portion 4d opposes the first opening/closing valve mechanism 30. Due to this, in the first opening/closing valve mechanism 30, as shown in FIG. 9, the valve body 31 receives the hydraulic pressure introduced to the hydraulic pressure introduction chamber 33 and the valve body main portion 38 is put into the advanced state, so that the valve surface 39v is separated from the valve seat 32a and the valve mechanism is changed over from the valve closed state to the valve open state, and the air passages 35a through 35f are put into the communicating state. At this time the valve mechanism transitions reliably from the valve closed state to the valve open state, since the annular engagement portion 39c is pushed and shifted inwards by the stepped portion on the engagement shaft portion 38c. It should be understood that the changeover from the valve closed state to the valve open state corresponds to the "changing over of the open or closed state".

By contrast, when the hydraulic pressure in the clamping hydraulic chamber 14 of the clamp device 1 is changed over to drain pressure, and hydraulic pressure is supplied to the unclamping hydraulic chamber 15, so that the clamp device 1 goes into the unclamped state, as shown in FIG. 2, then the hydraulic pressure in the hydraulic pressure introduction chamber 33 becomes equal to drain pressure, and the valve body main portion 38 is pushed and driven towards the cap member 32 by the large diameter rod portion 4e of the piston rod member 4a. And, since the frictional force due to the seal member 42 operates between the valve body main portion 38 and the movable valve body 39, accordingly the movable valve body 39 also shifts along with the valve body main portion 38, and the valve surface 39v contacts against the valve seat 32a so that the valve mechanism changes over from the valve open state to the valve closed state, and the connection between the air passage 35c and the air passage 35d becomes closed off.

In this valve closed state, the movable valve body 39 is also biased towards the valve closed side by the air pressure acting on the movable valve body 39. And, since the air pressure within the upstream side air passage 21a further upstream from the first opening/closing valve mechanism 30 rises due to this changeover to the valve closed state, accordingly it is possible to detect the fact that the piston rod member 4a has reached its raised limit position with the pressure switch 21n. It should be understood that this changeover from the valve closed state to the valve open state also corresponds to the "changing over of the open or closed state".

And when, from the state shown in FIG. 2, the piston rod member 4a starts to move downwards, then, as shown in FIG. 7, without changing of the position of the movable body 39, slight advance shifting of the valve body main portion 38 is permitted by the annular tapered surface 4t at the upper end of the large diameter rod portion 4e, and the stepped portion of the engagement shaft portion 38c engages with the annular engagement portion 39c, so that thereafter the valve mechanism 30 changes over from the valve closed state to the valve open state shown in FIG. 9.

Next, the second opening/closing valve mechanism 50 will be explained. As shown in FIGS. 1, 3, 8, and 10, the second opening/closing valve mechanism 50 has a similar structure to that of the first opening/closing valve mechanism 30, and accordingly the construction of this second opening/closing valve mechanism 50 will be explained in a simple manner. The second opening/closing valve mechanism 50 is disposed in an installation hole 56 in the central portion of the lower end wall member 13 in a vertical orientation, and the second opening/closing valve mechanism 50 is provided so as to be capable of opening and closing the downstream end portion of the second air passage 22. The second opening/closing valve mechanism 50 comprises a valve body 51, a cap member 52, a valve seat 52a, a hydraulic pressure introduction chamber 53 (i.e. a fluid pressure introduction chamber), a hydraulic pressure introduction passage 54 (i.e. a fluid pressure introduction passage), and internal air passages 55a through 55d, and is installed in the vertical installation hole 56 of the lower end wall member 13, via the cap member 52 and an annular member 57.

The cap member 52 is fixed to the lower end wall member 13 by screw engagement, and is sealed by a seal member 52s. The annular member 57 is fixed at an intermediate portion of the installation hole 56. And a through hole 57a having the same diameter as the small diameter hole 56a of the installation hole 56 is formed in the horizontal wall of the annular member 57.

The valve body 51 comprises a valve body main portion 58 and a movable valve body 59. The valve body main portion 58 consists of a small diameter rod portion 58a and a large diameter rod portion 58b that are formed integrally, and the large diameter rod portion 58b is received in a reception chamber 52b that is formed in the cap member 52 and the annular member 57, while the small diameter rod portion 58a is inserted into the small diameter hole 56a and the through hole 57a so as to slide freely therein, and so that it can partially project upwards from the upper end surface of the lower end wall member 13.

At the upper end portion of the large diameter rod portion 58b, an engagement rod portion 58c of slightly smaller diameter is formed. The movable valve body 59 has a small diameter barrel portion 59a and a large diameter portion 59b, and an annular engagement portion 59c is formed at the upper end neighborhood portion of the small diameter barrel portion 59a, and is fitted over the engagement rod portion 58c.

It should be understood that there are also provided a seal member 60 that seals the external periphery of the small diameter rod portion 58a, a seal member 61 that seals the external periphery of the large diameter rod portion 58b, and a seal member 62 that seals between the large diameter rod portion 58b and the movable valve body 59.

As an internal air passage, an annular air passage 55a that communicates with the downstream end portion of the second air passage 22 is formed in the external circumferential portion of the annular member 57. And an air passage 55b that communicates with the annular air passage 55a is formed in the wall portion of the annular member 57. A cap shaped air passage 55c is formed between the annular member 57 and the movable valve body 59, and communicates with the air passage 55b. An air passage 55d that can communicate with the air passage 55c is formed in the cap member 52. An annular valve seat 52a is formed on the upper end surface of the cap member 52, and an annular valve surface 59v that can either contact against the annular valve seat 52a or be separated therefrom is formed on the lower surface of the movable valve body 59.

Next, the operation of the hydraulic pressure cylinder 3 with the second opening/closing valve mechanism 50 will be explained.

Figure 3:
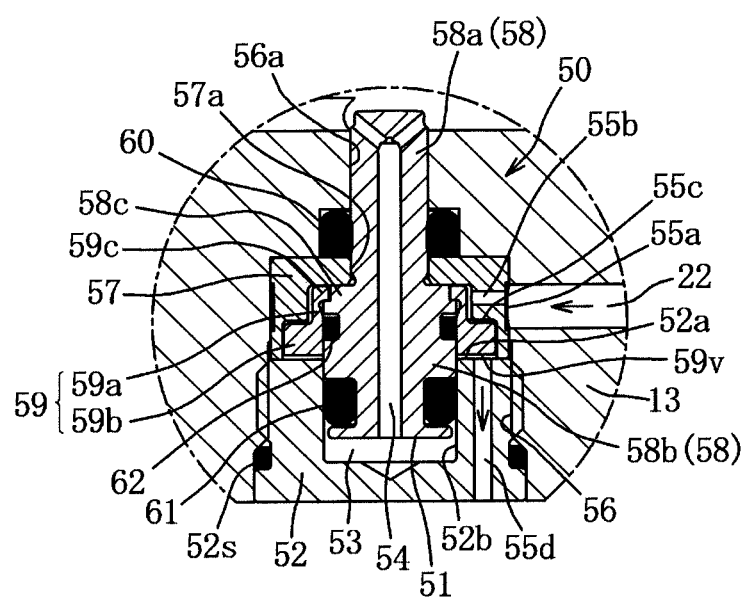
FIG. 3 is an enlarged view of a portion "b" of FIG. 1.
Figure 4:
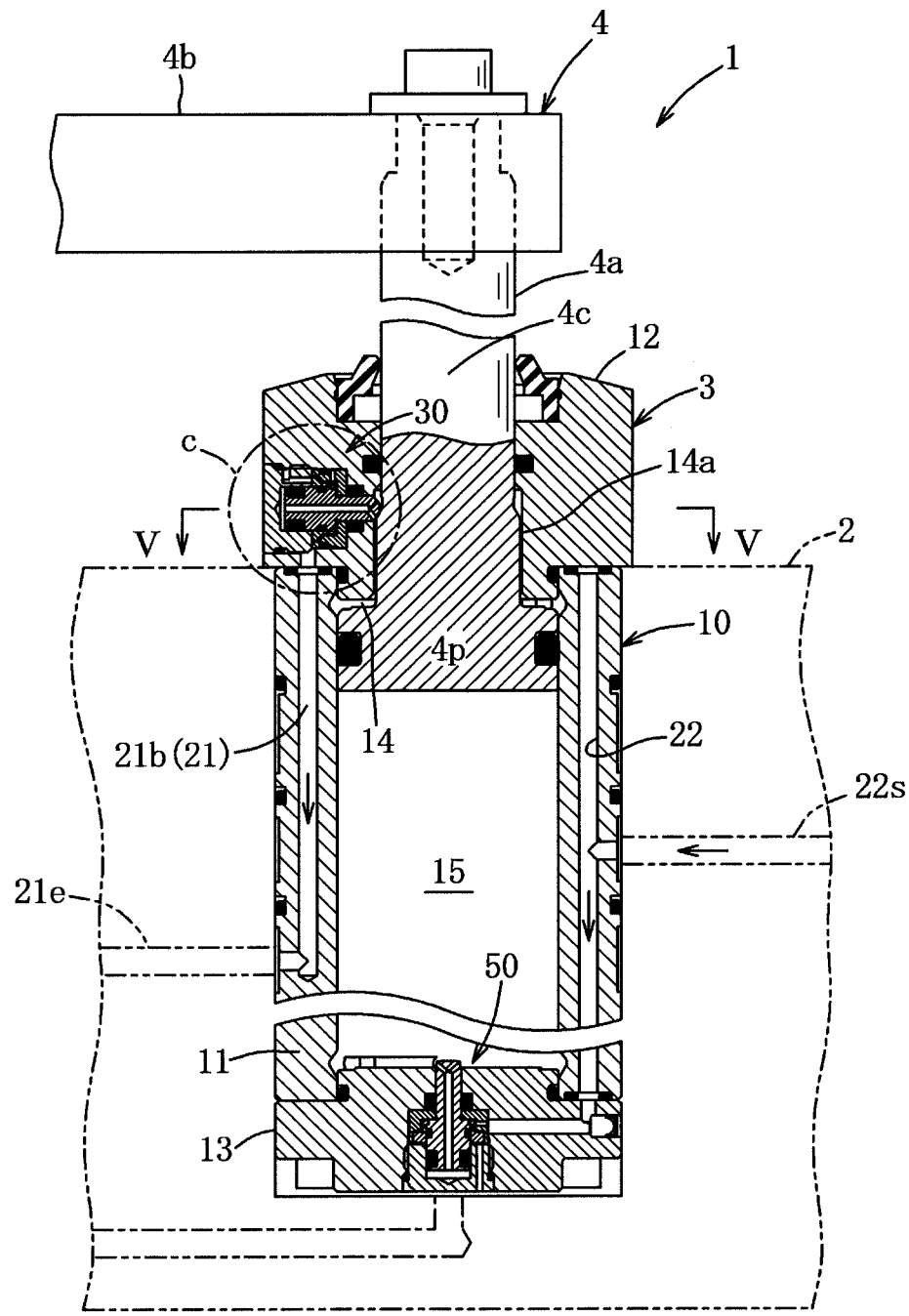
FIG. 4 is a sectional view of the clamp device (a position just before its raised limit position)
Figure 5:
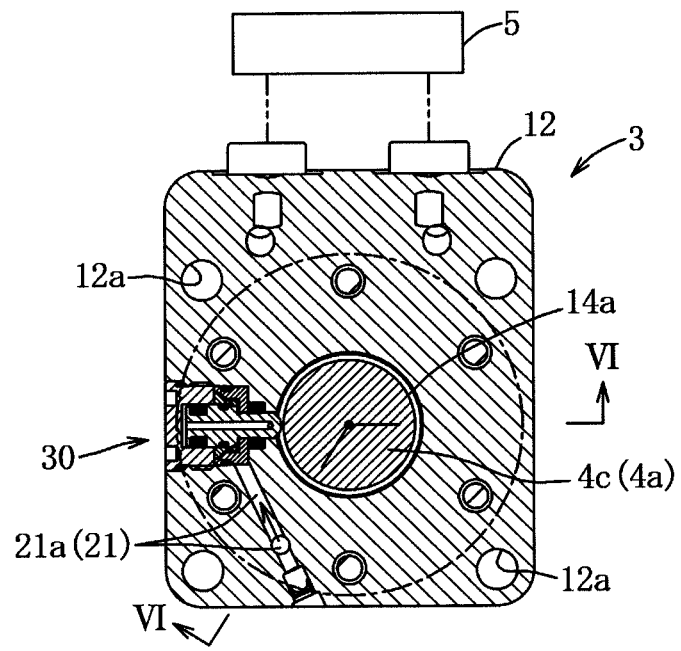
FIG. 5 is a sectional view 4 taken along lines V-V of FIG.
Figure 6:
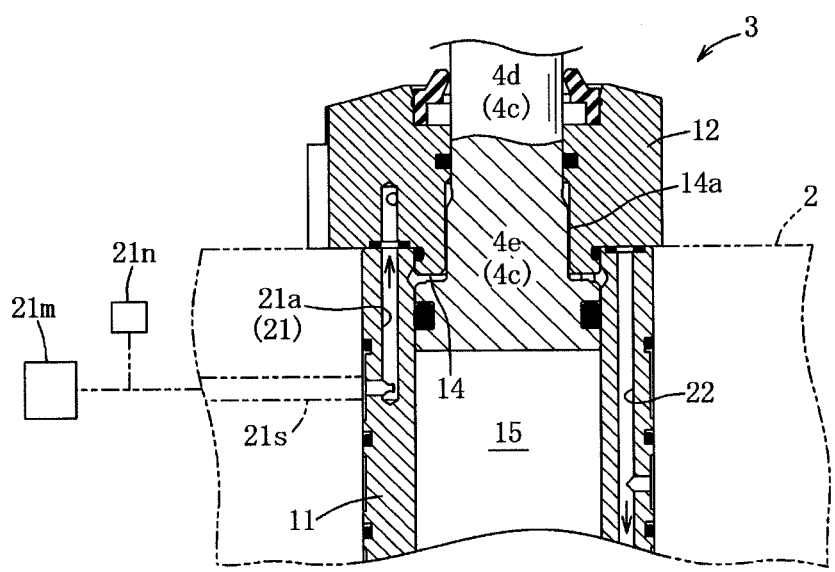
FIG. 6 is a sectional view taken along lines VI-VI of FIG. 5.

When the clamp device 1 shown in FIGS. 1 and 3 is in the unclamped state, since hydraulic pressure is charged into the unclamping hydraulic chamber 15, accordingly hydraulic pressure is introduced into the hydraulic pressure introduction chamber 53 from the hydraulic pressure introduction passage 54, so that the valve body 51 is biased upward and shifted upward by the hydraulic pressure in the hydraulic pressure introduction chamber 53, and the movable valve body 59 is also shifted upward via the engagement between the annular engagement portion 59c and the small diameter rod portion 58c, and thereby the annular valve surface 59v is removed away from the annular valve seat 52a and the valve mechanism 50 is held in the valve open state.

Figure 10:
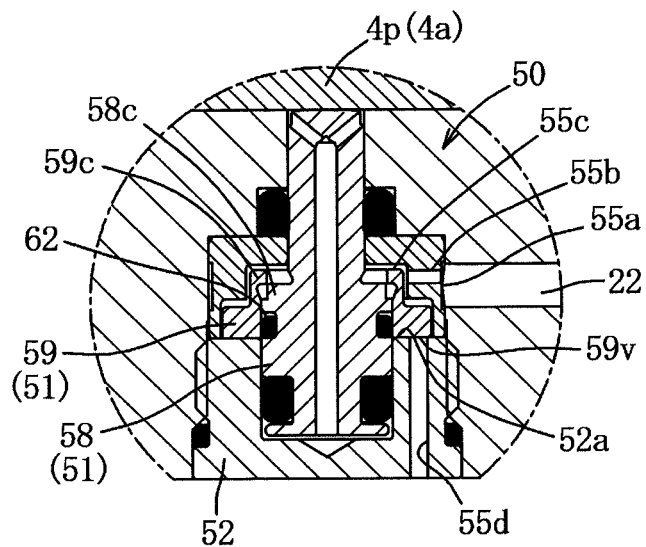
FIG. 10 is an enlarged view of a portion "e" of FIG. 8.

However, when hydraulic pressure is supplied to the clamping hydraulic chamber 14 of the clamp device 1 and also the hydraulic pressure in the unclamping hydraulic chamber 15 is changed over to drain pressure, then the piston rod member 4a drops to its lowered limit position, and the clamp device 1 changes over from its unclamped state to its clamped state, so that the piston portion 4p goes into the state of contacting against the upper surface of the lower end wall member 13. When this happens, as shown in FIG. 10, the valve body main portion 58 is pressed downward by the piston portion 4p, and the movable valve body 59 is also shifted downwards due to the frictional force of the seal member 62, so that the annular valve surface 59v contacts against the annular valve seat 52a and the valve mechanism 50 is changed over from the valve open state to the valve closed state. Since as a result the air pressure in the second air passage 22 rises, accordingly it is possible to detect, with the pressure switch 22n, the fact that the piston rod member 4a has shifted to its lowered limit position and that the clamp device has gone into the clamped state.

Since, according to this hydraulic pressure cylinder 1, it is possible to install the first and second opening/closing valve mechanisms 30, 50 in the clamp main body 10 by installing the first and second opening/closing valve mechanisms 30, 50 that open and close the air passages 21, 22 in the clamp main body 10 in the installation holes 36, 56 that are formed in the cylinder main body 10, accordingly it is possible to make the hydraulic pressure cylinder 1, which is capable of detecting the raised limit position and the lowered limit position of the output member 4, more compact.

Since, in the first opening/closing valve mechanism 30, the hydraulic pressure in the clamping hydraulic chamber 14 is introduced into the hydraulic pressure introduction chamber 33, so that it is possible to make this hydraulic pressure operate on the valve body 31 and hold the valve body 31 in the state of projecting toward the output member 4, accordingly this is advantageous from the points of view of reliability and durability. The same considerations are true for the second opening/closing valve mechanism.

When the output member 4 arrives at its prescribed position, then the valve body 31 or 51 is shifted by the output member 4, and it is possible reliably to detect the prescribed position of the output member 4 on the basis of the air pressure in the air passage 21 or 22, since the open or closed state of the first or the second opening/closing valve mechanism 30 or 50 is changed over.

Embodiment 2

Figure 11:
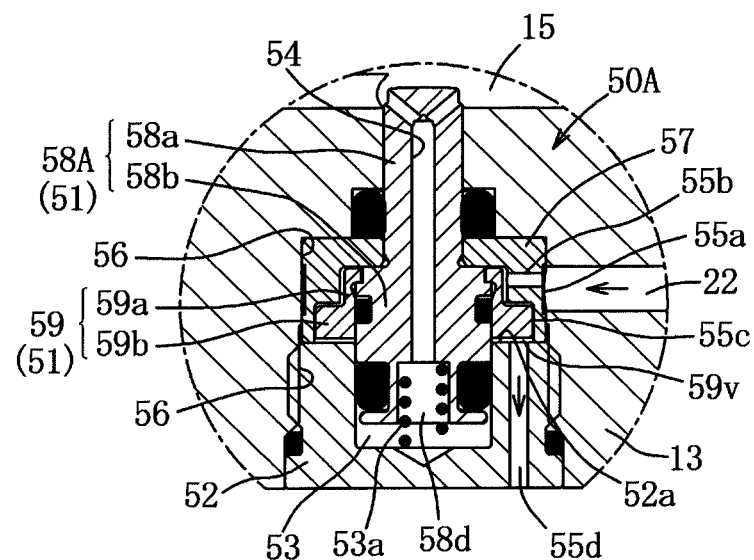
FIG. 11 is a sectional view of a second opening/closing valve mechanism (the valve open state of a second embodiment)
Figure 12:
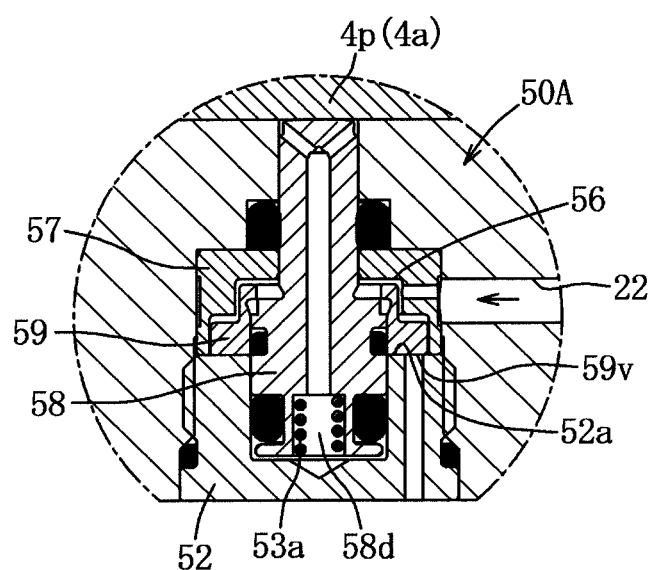
FIG. 12 is a sectional view of the opening/closing valve mechanism of FIG. 11 (the valve closed state)

A second opening/closing valve mechanism 50A will now be explained, this being a partially altered version of the second opening/closing valve mechanism 50 of the first embodiment. However, only the changed portions will be explained, and elements that are the same will be allocated the same reference numerals and explanation thereof will be omitted. As shown in FIGS. 11 and 12, a concave aperture 58d is formed in the lower end portion of the valve body main portion 58A with its lower end being open to the hydraulic pressure introduction chamber 53, and a compression coil spring 53a is installed in this concave aperture 58d and in the hydraulic pressure introduction chamber 53. The valve body main portion 58A is biased upward by the hydraulic pressure in the hydraulic pressure introduction chamber 53, and is also biased upward by the compression coil spring 53a.

Since the compression coil spring 53a is provided, accordingly, when Changeover from the clamped state to the unclamped state is taking place, it is possible to enhance the operational reliability of the valve body 51 during the transition period until the hydraulic pressure charged into the unclamping hydraulic chamber 15 has risen up. It should be understood that it would also be acceptable to install a compression coil spring to the first opening/closing valve mechanism 30 as well in a similar manner to that described above. Apart from the above, similar beneficial effects are obtained to those obtained in the case of the hydraulic pressure cylinder of the first embodiment.

Embodiment 3

Figure 13:
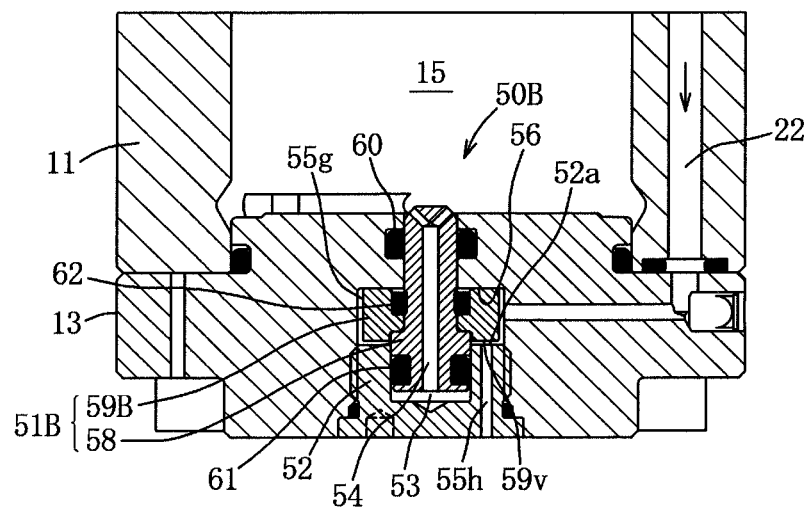
FIG. 13 is a sectional view of essential portions of a cylinder main body and of a second opening/closing valve mechanism (the valve open state) of a third embodiment.
Figure 14:
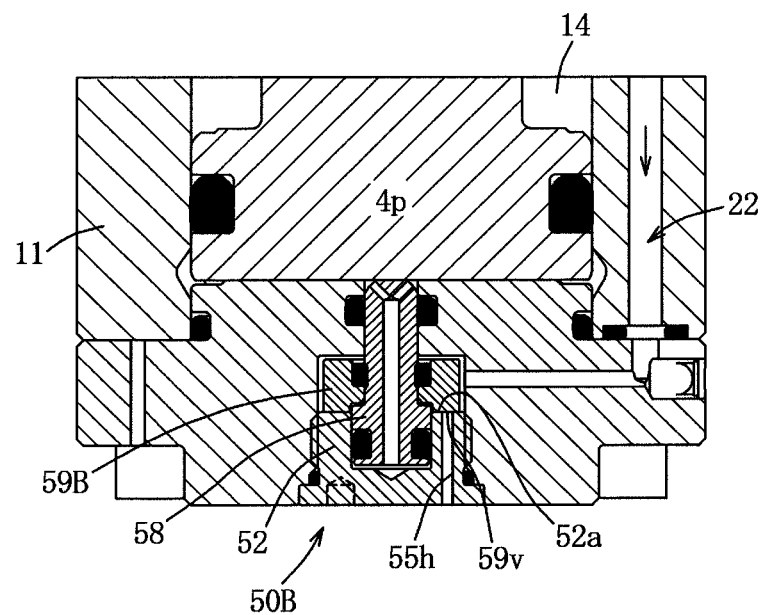
FIG. 14 is a sectional view of essential portions of the cylinder main body and of the opening/closing valve mechanism (the valve closed state) of the third embodiment.

Another second opening/closing valve mechanism 50B will now be explained, this being a partially altered version of the second opening/closing valve mechanism 50 of the first embodiment. However, only the changed portions will be explained, and elements that are the same will be allocated the same reference numerals and explanation thereof will be curtailed. As shown in FIGS. 13 and 14, the annular member 57 is omitted. The valve body 51B comprises a valve body main portion 58 and a movable valve body 59B that is fitted over this valve body main portion 58 so as to be movable. The valve body main portion 58 comprises a small diameter rod portion 58a and a large diameter rod portion 58b formed integrally therewith.

As internal air passages, there are provided an annular air passage 55g defined around the external periphery of the movable valve body 59B and communicating with the downstream end of the second air passage 22, and an air passage 55h formed so as to penetrate the cap member 52 in the vertical orientation and moreover capable of communicating with the annular air passage 55g. An annular valve seat 52a is formed on the upper end surface of the cap member 52, and an annular valve surface 59v is formed on the lower end surface of the movable valve body 59B. Seal members 60 through 62 are provided as shown in the drawings.

During the unclamped state shown in FIG. 13, since hydraulic pressure is supplied to the unclamping hydraulic chamber 15, the valve body main portion 58 and the movable valve body 59B are biased upward by the hydraulic pressure that is introduced to the hydraulic pressure introduction chamber 53 and reach their raised limit positions, so that the annular valve surface 59v is removed away from the annular valve seat 52a, and the valve open state is established.

Conversely to the situation described above, when as shown in FIG. 14 hydraulic pressure is supplied to the clamping hydraulic chamber 14 and the hydraulic pressure in the unclamping hydraulic chamber 15 is drained, the piston rod member 4a is lowered to its lowered limit position, and the piston portion 4p contacts against the upper surface of the lower end wall member 13. As a result, the valve body main portion 58 lowers, and the movable valve body 59B lowers together with the valve body main portion 58 due to the frictional force of the seal member 62, so that the annular valve surface 59v contacts against the annular valve seat 52a and the valve closed state is established. Since due to this the air pressure in the second air passage 22 rises, accordingly it is possible to detect the fact that the piston rod member 4a has reached its lowered limit position with the pressure switch 22n. Apart from the above, similar beneficial effects are obtained to those obtained in the case of the hydraulic pressure cylinder of the first embodiment.

Embodiment 4

Figure 15:
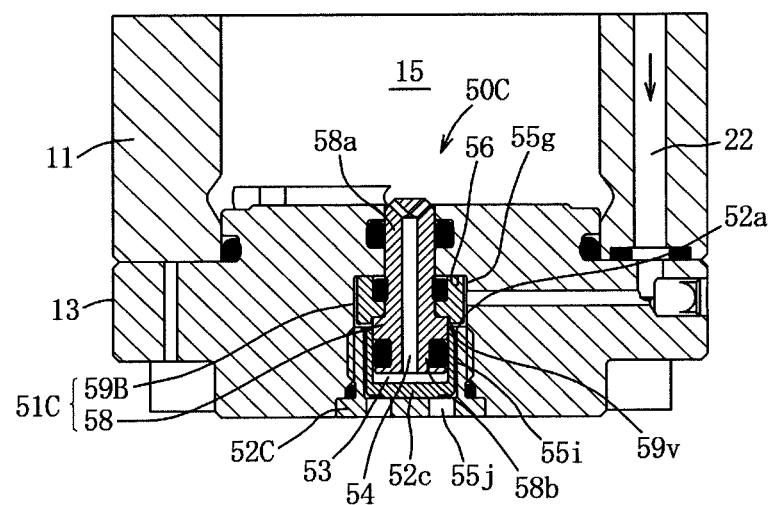
FIG. 15 is a sectional view of essential portions of a cylinder main body and of an opening/closing valve mechanism (the valve open state) of a fourth embodiment.
Figure 16:
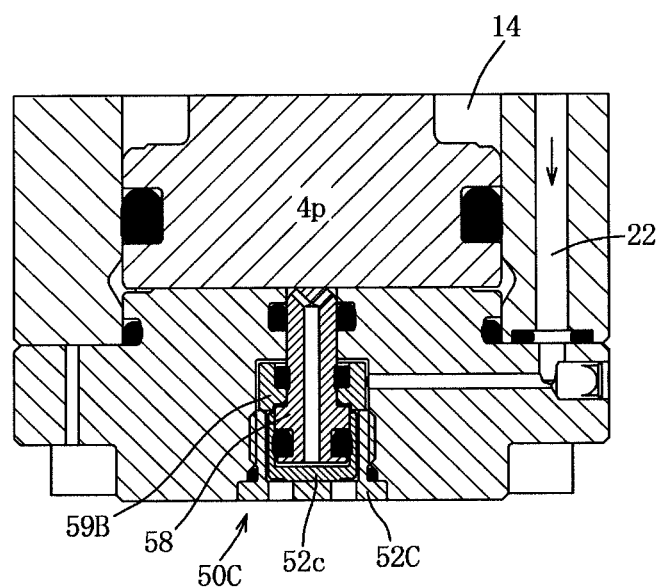
FIG. 16 is a sectional view of essential portions of the cylinder main body and of the opening/closing valve mechanism (the valve closed state) of the fourth embodiment.
Figure 17:
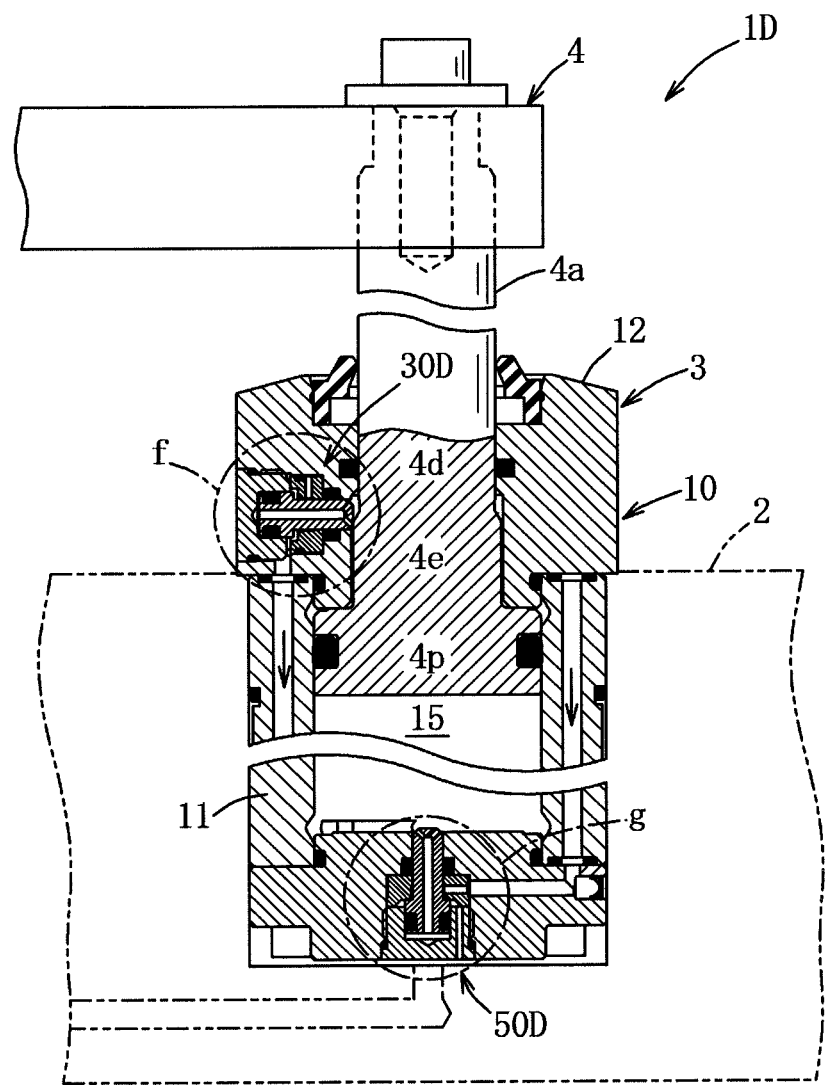
FIG. 17 is a sectional view of a clamp device (the unclamped state) according to a fifth embodiment.

A second opening/closing valve mechanism 50C will now be explained, this being a partially altered version of the second opening/closing valve mechanism 50B of the third embodiment. However, only the changed portions will be explained, and elements that are the same will be allocated the same reference numerals and explanation thereof will be omitted. As shown in FIGS. 15 and 16, the above described annular member 57 is omitted.

The valve body 51C comprises a valve body main portion 58 and a movable valve body 59B. A cap shaped cap member 52c is fixed in the interior of the cap member 52C, and the large diameter shaft portion 58b of the valve body main portion 58 is installed into a reception aperture of the cap member 52c so as to slide freely therein.

An annular valve seat 52a is formed on the upper end surfaces of the cap member 52C and of the cap member 52c, and an annular valve surface 59v is formed on the lower end of the movable valve body 59B. As internal air passages, there are provided an annular air passage 55g that is formed around the external periphery of the movable valve body 59B, an annular air passage 55i that is formed between the cap member 52c and the cap member 52C, and an air passage 55j that is formed through the bottom wall of the cap member 52C and that moreover communicates with the annular air passage 55i. It should be understood that the air passage 55j opens to the exterior, via the second air discharge passage 22e.

Since, as shown in FIG. 15, during the unclamped state, the hydraulic pressure in the unclamping hydraulic chamber 15 is introduced into the hydraulic pressure introduction chamber 53, accordingly, in a similar manner to the case for the second opening/closing valve mechanism 50B, the annular valve surface 59v is removed away from the annular valve seat 52a, so that the valve open state is established. However, during the clamped state, in a similar manner to the case for the second opening/closing valve mechanism 50B, the annular valve surface 59v is contacted against the annular valve seat 52a, so that the valve closed state is established. Since with this second opening/closing valve mechanism 50C the demand for accuracy in production of the components is relaxed, accordingly this is beneficial from the point of view of manufacture. Apart from the above, similar beneficial effects are obtained to those obtained in the case of the hydraulic pressure cylinder of the first embodiment.

Embodiment 5

In this clamp device 1D a first opening/closing valve mechanism 30D is provided instead of the first opening/closing valve mechanism 30 of the first embodiment, and a second opening/closing valve mechanism 50D is provided instead of the second opening/closing valve mechanism 50 of the first embodiment, while, since the other elements are the same as ones of the first embodiment, they will be allocated the same reference numerals, and explanation thereof will be omitted.

The first opening/closing valve mechanism 30 goes into the valve closed state when an output member 4 is in its raised limit position, and goes into the valve open state when the output member 4 is in its lowered limit position. However, this first opening/closing valve mechanism 30D goes into the valve open state when the output member 4 is in its raised limit position, and goes into the valve closed state when the output member 4 is in its limiting lowered position. As shown in FIGS. 17 through 24, the first opening/closing valve mechanism 30D comprises a cap member 32, an annular member 37D, a valve body 31D, a hydraulic pressure introduction chamber 33, a hydraulic pressure introduction passage 34, and internal air passages 35a, 35b, 35g, and 35h, and is installed in a horizontal orientation in an installation hole 36 that is formed in the upper end wall member 12. The valve body 31D consists only of a valve body main portion 38, with the valve body main portion 38 being integrally formed from a small diameter shaft portion 38a and a large diameter rod portion 38b.

The large diameter shaft portion 38b is received in a reception chamber 32b formed in the cap member 32 and the annular member 37D so as to be movable, and the small diameter rod portion 38a is inserted into the through hole 37a of the annular member 37D and the small diameter hole 36a of the installation hole 36 so as to slide freely therein. And seal members 32s, 40, and 41 are provided.

As internal air passages, there are provided: the air passage 35a, which communicates with the upstream side air passage 21a and moreover is formed around the external circumferential portion of the annular member 37D; the air passage 35b, which is formed in the wall portion of the annular member 37D; the annular air passage 35g, which is formed around the internal circumferential portion of the annular member 37D, so as to communicate with the air passage 35b; and the air passage 35h, which is formed between the cap member 32 and the annular member 37, and moreover is communicated with the upstream end of the downstream side air passage 21b. An annular valve surface 38c is formed on the end surface of the large diameter rod portion 38b of the valve body main portion 38, and an annular valve seat 37b is formed on the end surface of the annular member 37D, and can either contact against the annular valve surface 38c or be removed away therefrom.

Figure 18:
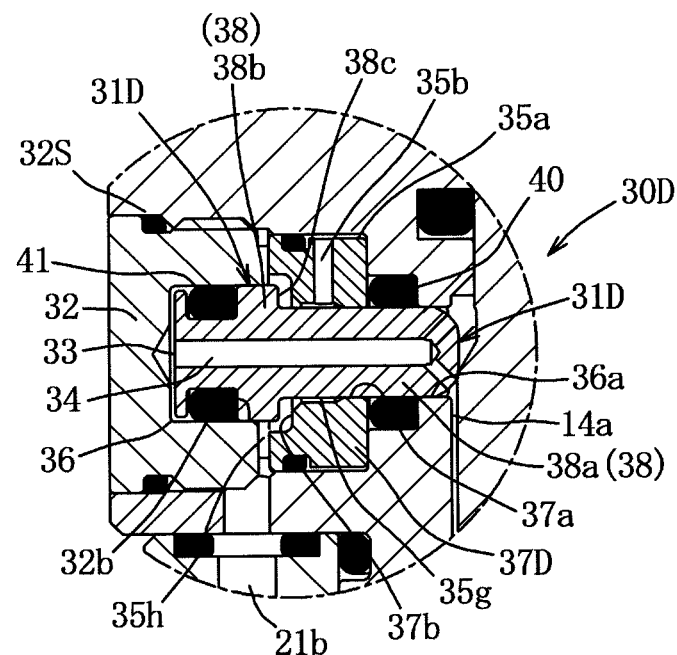
FIG. 18 is an enlarged view of a portion "f" of FIG. 17.
Figure 21:
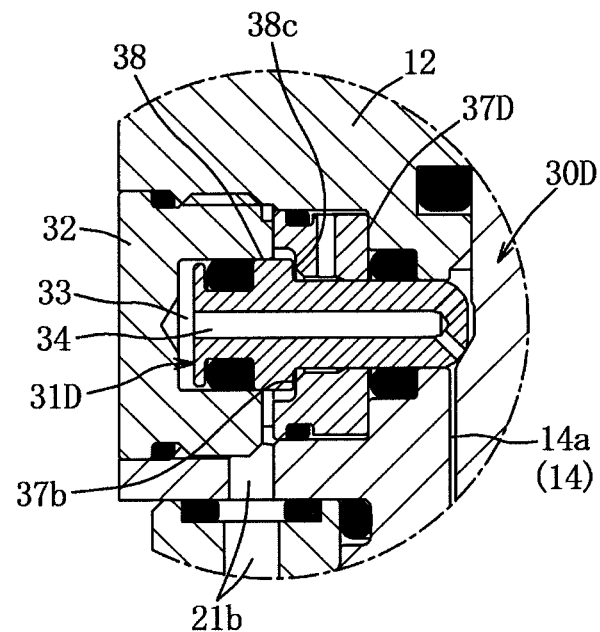
FIG. 21 is an enlarged view of a portion "h" of FIG. 20.

When, as shown in FIG. 18, the clamp device 1 is in the unclamped state, and the piston rod member 4a is in its raised limit position, the valve body main portion 38 is pushed toward the cap member 32 by the large diameter rod portion 4e of the piston rod member 4a, since the annular member 37D does not shift, accordingly the annular valve surface 38c is removed away from the annular valve seat 37b, and the valve open state is established. As a result it is possible to detect from the pressure switch 21n that the output member 4 has reached its raised limit position, since the air pressure in the upstream side air passage 21a of the first air passage 21 decreases. And, as shown in FIG. 21, even when the output member lowers slightly, the valve closed state is still maintained.

Figure 23:
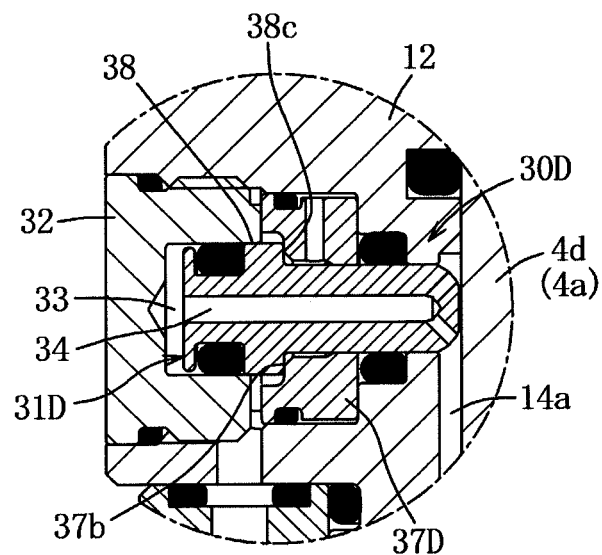
FIG. 23 is an enlarged view of a portion "i" of FIG. 22.

And when, conversely to the above description, the clamped state is established and hydraulic pressure is supplied to the clamping hydraulic pressure chamber 14, since, as shown in FIG. 23, hydraulic pressure is introduced from the hydraulic pressure introduction passage 34 to the hydraulic pressure introduction chamber 33, so that the valve body main portion 38 is advanced towards the output member 4 (i.e. toward its small diameter rod portion 4d), accordingly the annular valve surface 38c is contacted against the annular valve seat 37b, and the valve closed state is established. As a result, it is possible to detect from the pressure switch 21n that the output member 4 has been lowered from its raised limit position, since the air pressure in the upstream side air passage 21a rises.

Next, the second opening/closing valve mechanism 50D will be explained.

Figure 19:
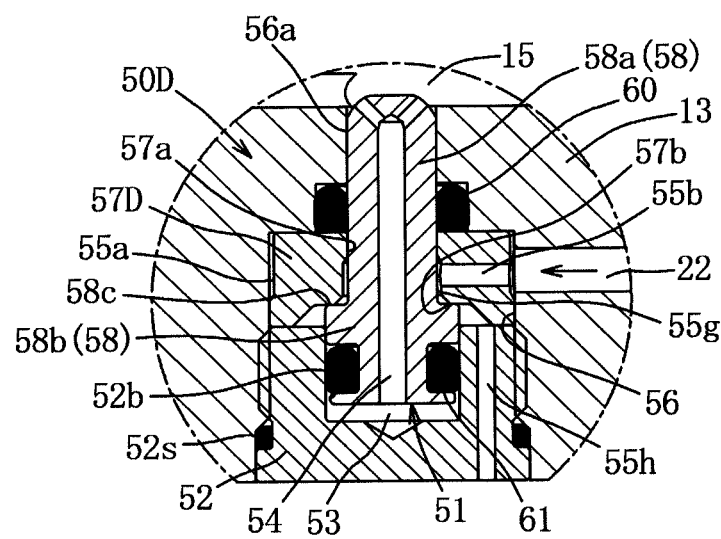
FIG. 19 is an enlarged view of a portion "g" of FIG. 17.
Figure 20:
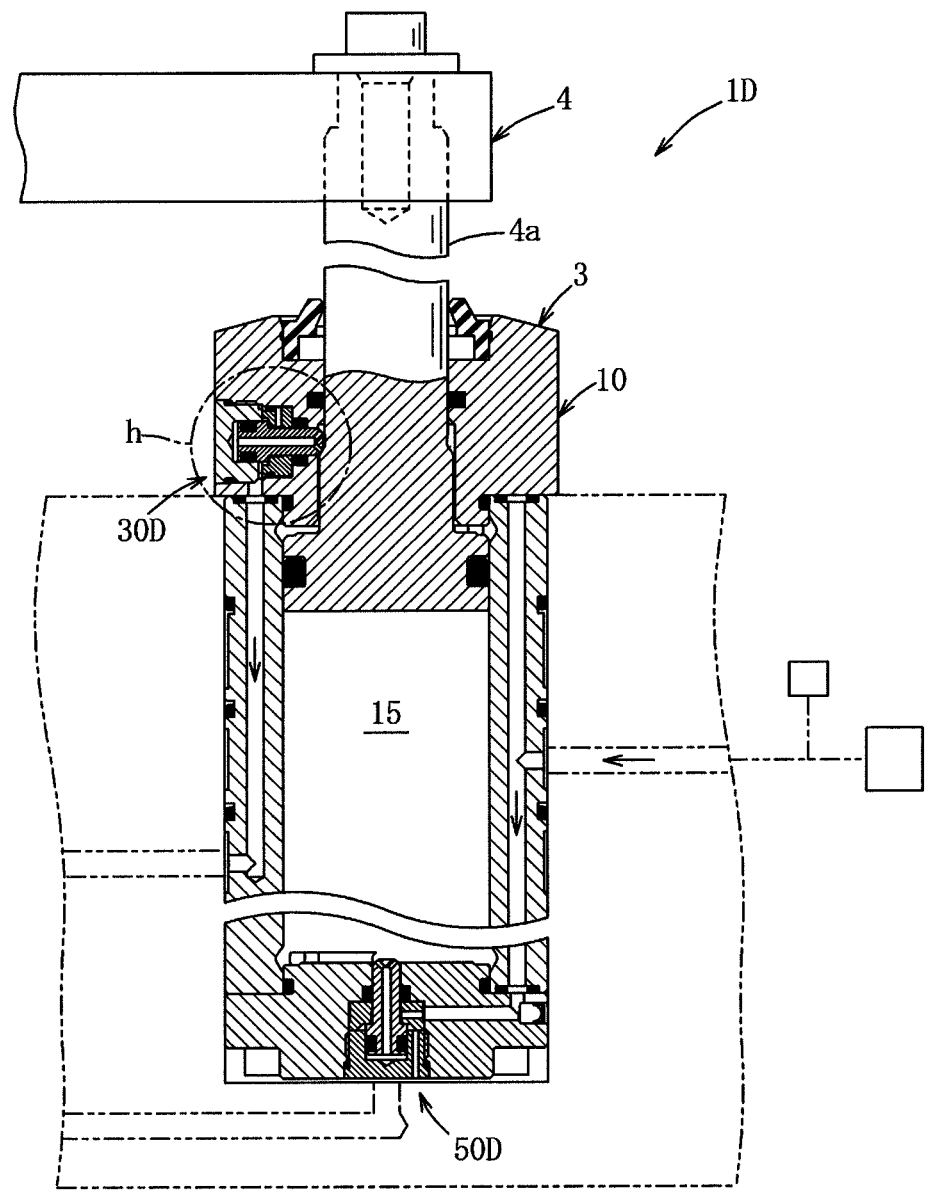
FIG. 20 is a sectional view of the clamp device (a position just before its raised limit position) according to the fifth embodiment.

As shown in FIG. 19, the second opening/closing valve mechanism 50D comprises a cap member 52, an annular member 57D, a valve body 51, a hydraulic pressure introduction chamber 53, a hydraulic pressure introduction passage 54, and internal air passages 55a, 55b, 55g, and 55h, and is installed in a vertical installation hole 56 formed in the lower end wall member 13. The valve body 51 consists only of a valve body main portion 58, and the valve body main portion 58 comprises a small diameter rod portion 58a and a large diameter rod portion 58b, formed integrally together. The large diameter rod portion 58b is received in a movable manner in a reception chamber 52b that is defined by the cap member 52 and the annular member 57D, and the small diameter rod portion 58a is passed through a through hole 57a of the annular member 57D and a small diameter hole 56a of the installation hole 56, so as to slide freely therein. Moreover, seal members 52s, 60, and 61 are provided.

As internal air passages, there are provided: an air passage 55a that is formed around the external circumferential portion of the annular member 57D so as to communicate with the second air passage 22; an air passage 55b that is formed in the wall portion of the annular member 57D so as to communicate with the air passage 55a; an annular air passage 55g that is formed around the internal circumferential portion of the annular member 57D so as to communicate with the air passage 55b; and an air passage 55h that is formed in the cap member 52, and that communicates with the second air discharge passage 22e. An annular valve surface 58c is formed on the end surface of the large diameter rod portion 58b of the valve body main portion 58, and an annular valve seat 57b is formed on the end surface of the annular member 57D, and is capable of contacting against the annular valve surface 58c or of being removed therefrom.

When the clamp device 1D is in the unclamped state, as shown in FIG. 19, and in the state in which hydraulic pressure is supplied to the unclamping hydraulic chamber 15 and the piston rod member 4a is not in its lowered limit position, since hydraulic pressure is introduced into the hydraulic pressure introduction chamber 53 from the hydraulic pressure introduction passage 54, and the valve body main portion 58 is shifted to advance slightly upwards, accordingly the annular valve surface 58c is contacted against the annular valve seat 57b, so that the valve closed state is established. Since, as a result, the air pressure in the second air passage 22 rises, accordingly it is possible to detect the fact that the output member 4 has been elevated from its lowered limit position from the pressure switch 22n.

Figure 22:
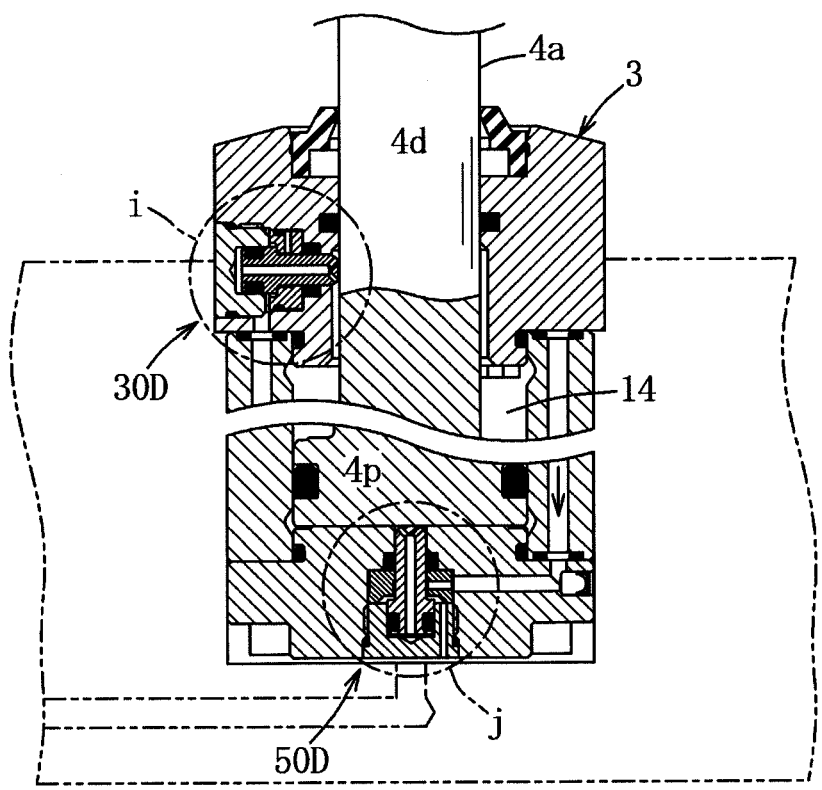
FIG. 22 is a sectional view of the clamp device (the clamped state) according to the fifth embodiment.
Figure 24:
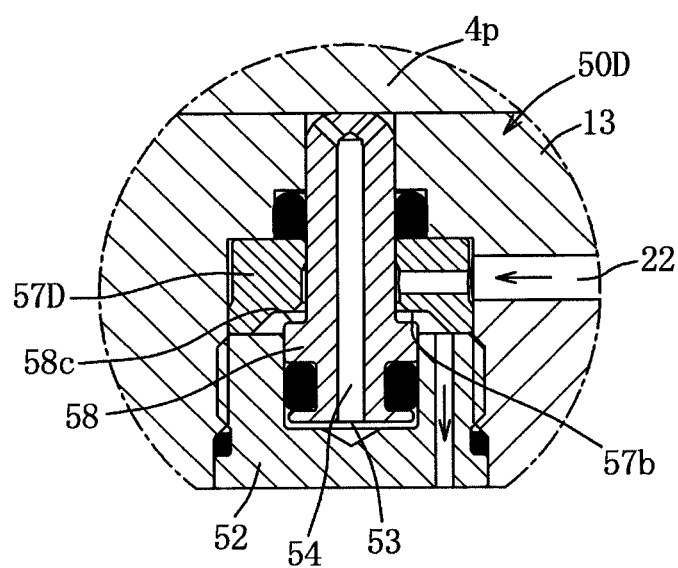
FIG. 24 is an enlarged view of a portion "j" of FIG. 22.

On the other hand, when as shown in FIGS. 22 and 24 hydraulic pressure is supplied to the clamping hydraulic chamber 14 and the clamped state is established, since the piston rod member 4a is lowered to its lowered limit position, the piston portion 4p contacts against the upper surface of the lower end wall member 13, and the valve body main portion 58 moves to press against the cap member 52, and the annular member 57D is not shifted, accordingly the annular valve surface 58c is removed away from the annular valve seat 57b, so that the valve open state is established. Since, as a result, the air pressure in the second air passage 22 drops, accordingly it is possible to detect the fact that the output member 4 has reached its lowered limit position from the pressure switch 22n. Apart from the above, similar beneficial effects are obtained to those obtained in the case of the hydraulic pressure cylinder of the first embodiment.

Embodiment 6

This is an example of a case in which the present invention has been applied to a hydraulic pressure cylinder 3E that is applied to a clamp device.

Figure 25:
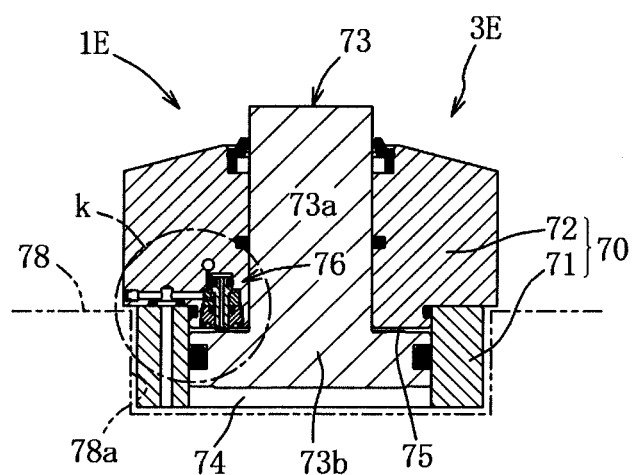
FIG. 25 is a sectional view of a clamp device (the unclamped state) according to a sixth embodiment.
Figure 26:
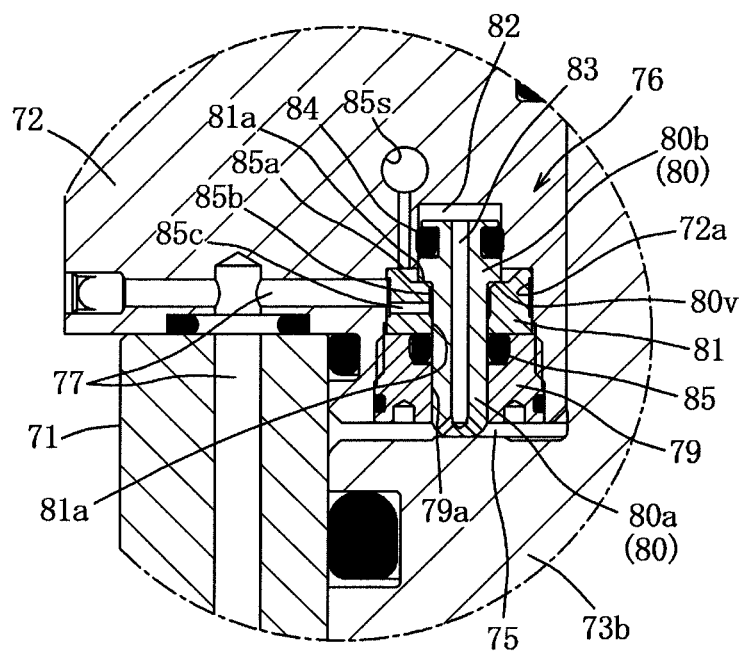
FIG. 26 is an enlarged view of a portion "k" of FIG. 25.
Figure 27:
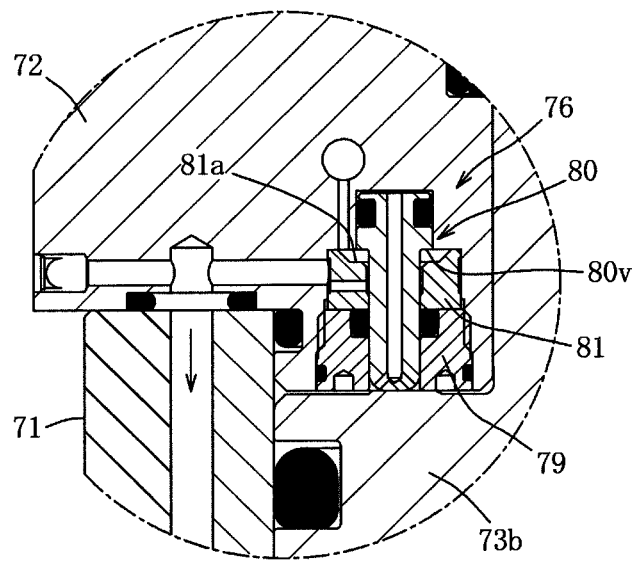
FIG. 27 is a figure corresponding to FIG. 26, for the clamped state.
Figure 28:
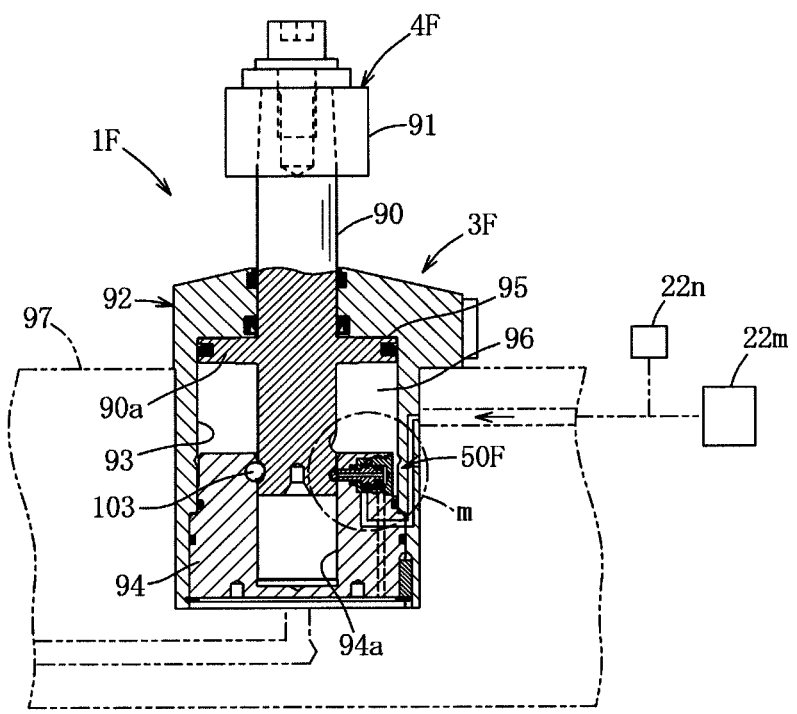
FIG. 28 is a sectional view of a clamp device (the clamped state) according to a seventh embodiment.

As shown in FIGS. 25 through 27, the hydraulic pressure cylinder 3E of the clamp device 1E comprises a cylinder main body 70, an output member 73, a clamping hydraulic chamber 74, an unclamping hydraulic chamber 75, a opening/closing valve mechanism 76, an air passage 85s to which pressurized air is supplied, an air passage 77 from which pressurized air is ejected, and so on. It should be understood that FIG. 25 shows the hydraulic pressure cylinder 3E when the clamp device is in the clamped state. This hydraulic pressure cylinder 3E is used in a state of being fitted into a concave aperture 78a in a base member 78 such as a work pallet or the like. The clamping hydraulic chamber 74 and the unclamping hydraulic chamber 75 are connected to a hydraulic pressure supply source. The air passage 85s is connected to a pressurized air supply source via an air supply passage (not shown in the drawing), and a pressure switch or a pressure sensor is connected to the air supply passage. The air passage 77 is opened to the exterior.

The output member 73 comprises a rod portion 73a and a piston portion 73b formed integrally therewith. And the cylinder main body 70 comprises a cylinder member 71 and an upper end wall member 72. The opening/closing valve mechanism 76 will now be explained in a simple manner, since its structure resembles that of the opening/closing valve mechanism 50D described above. The opening/closing valve mechanism 76 is installed in a vertical orientation in an installation hole 72a in the upper end wall member 72, so as to oppose the piston portion 73b. The opening/closing valve mechanism 76 comprises a cap member 79, a valve body 80, an annular member 81, a hydraulic pressure introduction chamber 82, a hydraulic pressure introduction conduit 83, and internal air passages 85a, 85b, 85c and so on.

The valve body 80 comprises a small diameter rod portion 80a and a large diameter rod portion 80b formed integrally therewith. The large diameter rod portion 80b is inserted into an aperture formed in the upper end wall member 72 so as to be movable, and is sealed with a seal member 84. And the small diameter rod portion 80a is inserted into a through hole 81a in the annular member 81 and a through hole 79a in the cap member 79 so as to slide freely therein, and can project from the lower surface of the upper end wall member 72. A seal member 85 is also provided between the small diameter rod portion 80a and the cap member 79.

As internal air passages, there are provided: the annular air passage 85a that communicates with the air passage 85s; the annular air passage 85b that can communicate with the air passage 85a and moreover is formed around the internal circumferential portion of the annular member 81; and the air passage 85c that communicates with the air passage 85b and moreover is formed in the wall portion of the annular member 81, and that communicates with an air passage 77 for venting. An annular valve seat 81a is formed on the upper surface of the annular member 81, and an annular valve surface 80v is formed on the lower end of the large diameter rod portion 80b, and can either contact against the annular valve seat 81a or be removed therefrom.

In the unclamped state in which hydraulic pressure is supplied to the unclamping hydraulic chamber 75 and hydraulic pressure is exhausted from the clamping hydraulic chamber 74, as shown in FIG. 26, hydraulic pressure is introduced from the hydraulic pressure introduction passage 83 into the hydraulic pressure introduction chamber 82, and the valve body 80 receives the hydraulic pressure and shifts downward, so that the annular valve surface 80v is contacted against the annular valve seat 81a and the valve closed state is established. As a result, since the air pressure in the air passage 85s rises, it is possible to detect the fact that the output member has been lowered from its raised limit position with the pressure switch or the pressure sensor.

Conversely to the above, in the clamped state in which hydraulic pressure is supplied to the clamping hydraulic chamber 74 and hydraulic pressure is exhausted from the unclamping hydraulic chamber 75, as shown in FIG. 27, since the output member 73 reaches its raised limit position, and the valve body 80 is pressed upward by the piston portion 73b, accordingly the annular valve surface 80v is removed away from the annular valve seat 81a and the valve open state is established, and it is possible to detect the fact that the clamped state has been established with the pressure switch or the pressure sensor, since the air pressure in the air passage 76 drops. Apart from the above, similar beneficial effects are obtained to those obtained in the case of the hydraulic pressure cylinder of the first embodiment.

Embodiment 7

A clamp device according to this embodiment will be explained on the basis of FIGS. 28 through 32.

In this clamp device 1F, in the initial stage of the output member 4F dropping from its raised limit position, the output member 4F twists around its axis by 90°, and thereafter shifts downward to its lowered limit position without twisting so that the clamped state is established. Moreover, in the initial stage of the output member 4F rising from the clamped state, the output member rises without twisting, and thereafter, in the final stage of rising, the output member 4F twists around its axis by 90° and reaches the unclamped state.

The hydraulic pressure cylinder 3F includes the output member 4F (i.e. the clamp rod, in other words the piston rod member 90), and a clamp arm 91 is fixed to the upper end portion of the output member 4F. And the cylinder main body 92 has a cylinder hole 93, and a rod insertion aperture 94a is formed in the lower end wall member 94 of the cylinder main body 92.

A piston portion 90a that slides within the cylinder hole 93 is formed at an intermediate stepped portion of the piston rod member 90, and, within the cylinder hole 93, a clamping hydraulic chamber 95 is defined above the piston portion 90a, while an unclamping hydraulic chamber 96 is defined below the piston portion 90a.

A twist mechanism 100 that twists the piston rod member 90 comprises a plurality of cam grooves 101 that are formed within the unclamping hydraulic chamber 96 on the external circumferential portion of the piston rod member 90, and a plurality of steel balls 103 that are held in the lower end wall member 90, each of which engages with one of the plurality of cam grooves 101. The cam grooves 101 include vertically oriented straight grooves 101a in their upper half portions, and helical grooves 101b that connect to the lower ends of these straight grooves 101a.

A opening/closing valve mechanism 50F is provided to this clamp device 1F for detecting, when the piston rod member 90 transitions from the unclamped state to the clamped state (i.e. the piston rod member 90 lowers), the fact that the piston rod member 90 has completed its twisting operation.

This opening/closing valve mechanism 50F has a structure almost similar to that of the second opening/closing valve mechanism 50 of the first embodiment, and accordingly the same reference numerals will be appended to similar members, and the mechanism will be explained in a simple manner.

This opening/closing valve mechanism 50F comprises an installation hole 56 that is formed in a lower end wall member 94 and is directed in a horizontal direction, a valve body 51, a cap member 52, an annular member 57, a hydraulic pressure introduction chamber 53, and a hydraulic pressure introduction passage 54. The valve body 51 includes a valve body main portion 58 and a movable valve body 59, and the movable valve body 59 has an annular engagement portion, while the valve body main portion 58 has a small diameter rod portion.

An air passage 23 formed in the lower end wall member 94 is connected to an air supply source via an air supply passage, and a pressure switch or a pressure sensor is connected in the air supply passage. And an air passage 24 for venting is formed in the lower end wall member 94 and opens to the outside.

As internal air passages of the opening/closing valve mechanism 50F, there are provided: an annular air passage 55a that is formed around the external circumferential portion of the annular member 57, so as to communicate with the air passage 23; an air passage 55b that is formed in the annular member 57; a cap shaped air passage 55c that is defined between the annular member 57 and the movable valve body 59; and an air passage 55d that is formed in the cap member 52 so as to be able to communicate with the air passage 55c and moreover is communicated with the air passage for venting 24. An annular valve seat 52a is formed on the end surface of the cap member 52, and an annular valve surface 59v is formed on the movable valve body 59 and can either contact against the annular valve seat 52a or be removed away therefrom.

Figure 29:
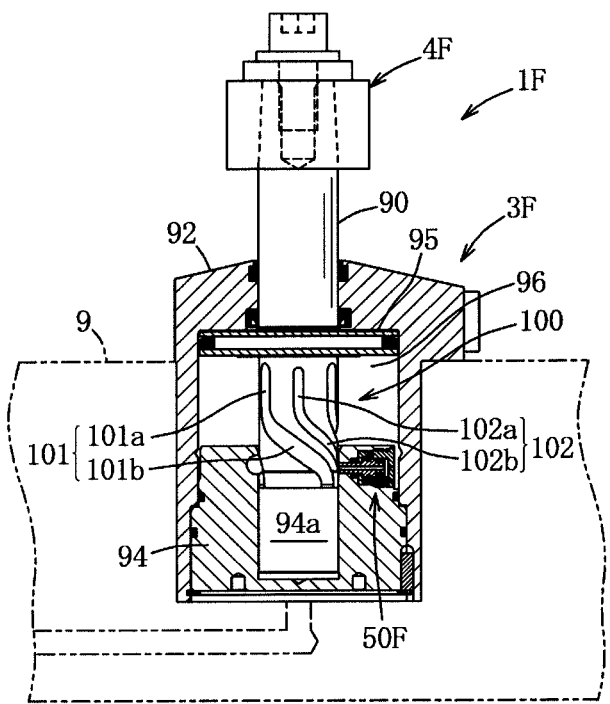
FIG. 29 is a sectional view of the clamp device (the unclamped state) according to the seventh embodiment.
Figure 30:
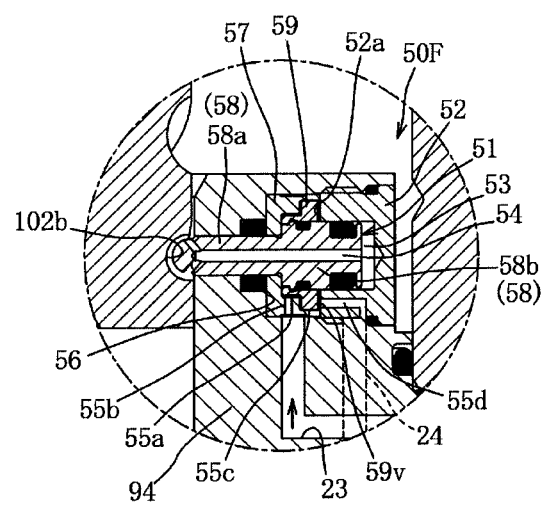
FIG. 30 is an enlarged view of a portion "m" of FIG. 28.

A detection groove 102 that is similar to the abovementioned cam grooves 101 is formed within the unclamping hydraulic chamber 96, in the external circumferential portion of the piston rod member 90, and the half spherical end portion of the valve body main portion 58 of the opening/closing valve mechanism 50F engages with the detection groove. The detection groove 102 has a straight groove 102a in its upper half portion, and a helical groove 102b continuing on from the lower end of the straight groove 102a. The helical groove 102b is cut deeply, while the straight groove 102a is cut to a depth around one half of the depth of the helical groove 102b. During the unclamped state, the hydraulic pressure in the unclamping hydraulic chamber 96 is introduced from the hydraulic pressure introduction passage 54 to the hydraulic pressure introduction chamber 53, and the end portion of the valve body main portion 58 projects into the helical groove 102b. Due to this, as shown in FIGS. 29 and 30, the annular valve surface 59v is removed away from the annular valve seat 52a, so that the valve open state is established. As a result, the air pressure in the air passage 23 drops.

Figure 31:
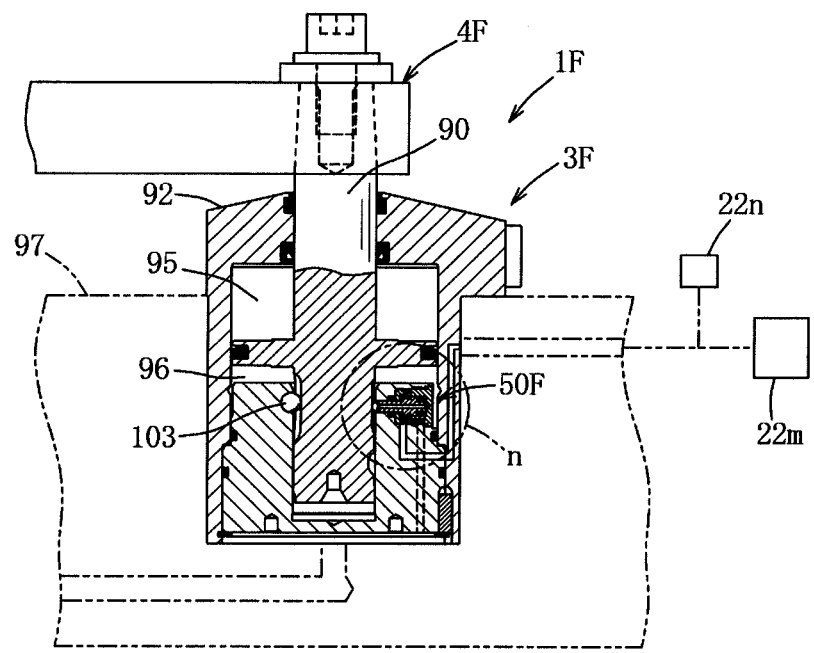
FIG. 31 is a sectional view of the clamp device (the clamped state) according to the seventh embodiment.
Figure 32:
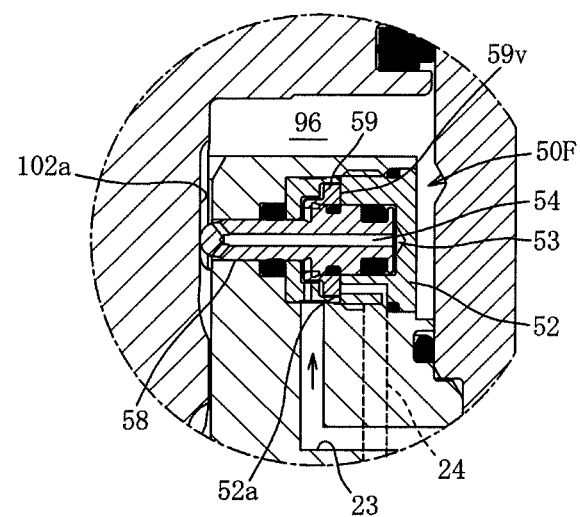
FIG. 32 is an enlarged view of a portion "n" of FIG. 31.
Figure 33:
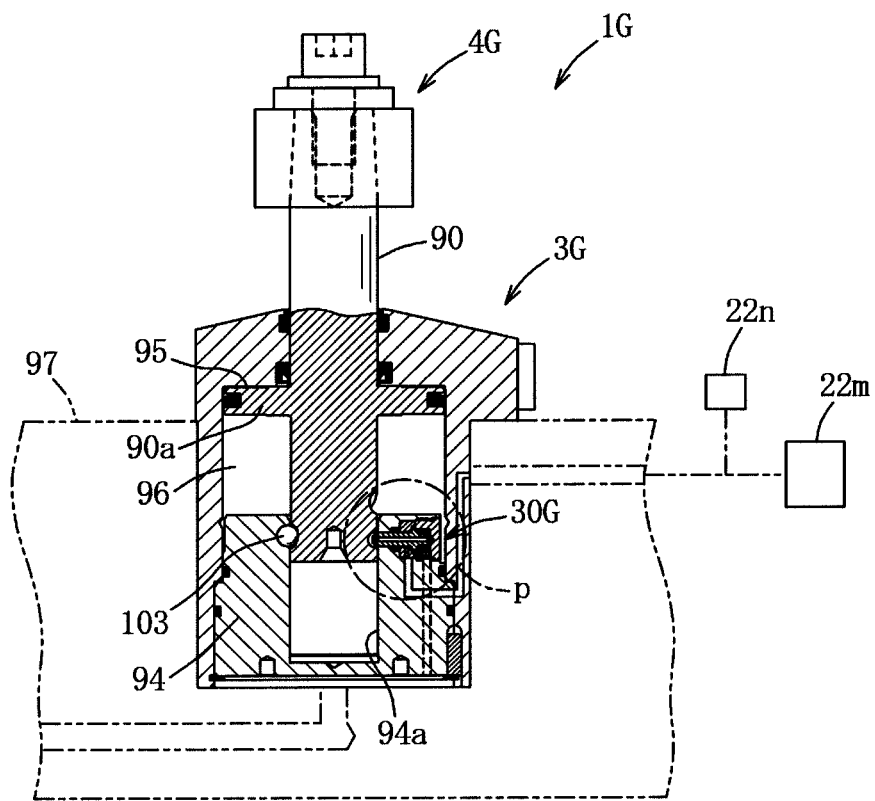
FIG. 33 is a sectional view of a clamp device (the unclamped state) according to an eighth embodiment.

On the other hand, when the hydraulic pressure in the unclamping hydraulic chamber 96 is vented, and hydraulic pressure is supplied to the clamping hydraulic chamber 95, the piston rod member 90 lowers, and, as shown in FIGS. 31 and 32, the end of the valve body main portion 58 comes to be in the state of being engaged into the straight groove 102a. Since, when this occurs, the valve body main portion 58 is pressed by the piston rod member 90 and moves towards the cap member 52, accordingly the annular valve surface 59v is contacted against the annular valve seat 52a, so that the valve closed state is established. As a result, since the air pressure in the upstream side of the air passage 23 rises, this can be detected with the pressure switch or the pressure sensor. In other words, it is possible reliably to detect the twist operation completed position of the piston rod member 90 on the basis of the signal from the pressure switch. It should be understood that the twist operation completed position of the piston rod member 90 corresponds to the "prescribed position of the output member". Apart from the above, similar beneficial effects are obtained to those obtained in the case of the hydraulic pressure cylinder of the first embodiment.

Embodiment 8

A clamp device 1G according to this eighth embodiment will be explained on the basis of FIGS. 33 through 36. This clamp device 1G is similar to the clamp device 1F of the seventh embodiment, but the construction of the opening/closing valve mechanism 30G is somewhat different. Thus, to elements that are similar to ones of the clamp device 1F of the seventh embodiment, the same reference symbols will be allocated, and explanation thereof will be omitted, while the opening/closing valve mechanism 30G will be explained.

This opening/closing valve mechanism 30G has a similar structure to that of the first opening/closing valve mechanism 30D of the fifth embodiment, and accordingly the same reference numerals will be appended to similar members, and the mechanism will be explained in a simple manner. In the opening/closing valve mechanism 50F of the seventh embodiment described above, the valve open state was established when the output member 4F was performing twist operation, while the valve closed state was established after the twist operation of the output member 4F was completed. However, with this opening/closing valve mechanism 30G, the valve closed state is established during twist operation of the output member 4F, while the valve open state is established after the twist operation of the output member 4F is completed.

The opening/closing valve mechanism 30G comprises a cap member 32, an annular member 37D, a valve body 31D, a hydraulic pressure introduction chamber 33, a hydraulic pressure introduction passage 34, and internal air passages 35i, 35j, 35k, 35m, and 35n, and is installed in a horizontal orientation in an installation hole 36 that is formed in the lower end wall member 94. The valve body 31D consists only of a valve body main portion 38, and the valve body main portion 38 consists of a small diameter rod portion 38a and a large diameter shaft portion 38b formed integrally therewith.

The large diameter rod portion 38b is received in a reception chamber defined by the cap member 32 and the annular member 37D so as to be movable therein, and the small diameter shaft portion 38a is inserted into a through hole 37a in the annular member 37D and a small diameter hole 36a in the installation aperture 36, so as to slide freely therein.

As internal air passages, there are provided: an air passage 35i that communicates with the air passage 23 and is formed around the external circumferential portion of the annular member 37D; an air passage 35j that is formed in the wall portion of the annular member 37D; an annular air passage 35k that is formed around the internal circumferential portion of the annular member 37D so as to communicate with the air passage 35j, an annular air passage 35m that can communicate with the air passage 35k; and an air passage 35n that is formed within the cap member 32 so as to communicate with the air passage 35m, and that communicates with the air passage 24. An annular valve seat 38c is formed on the end surface of the large diameter rod portion 38b of the valve body main portion 38, and an annular valve seat 37b is formed on the end surface of the annular member 37D, and can either contact against the annular valve surface 38c or be removed therefrom.

Figure 34:
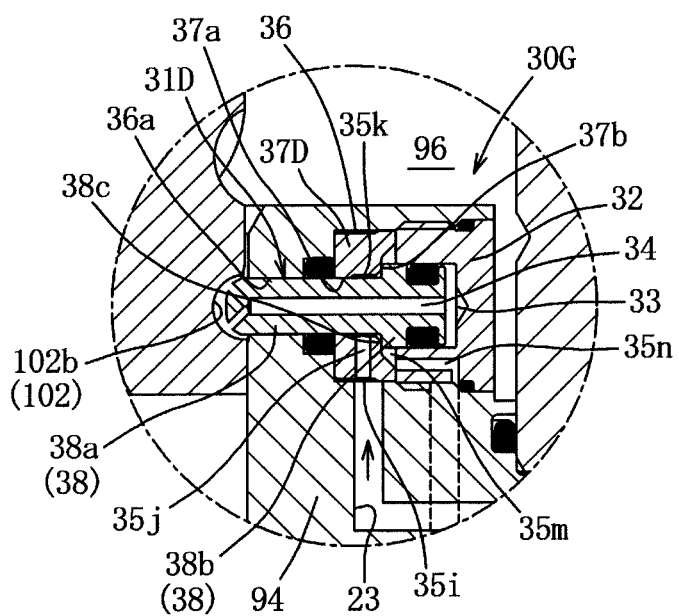
FIG. 34 is an enlarged view of a portion "p" of FIG. 33.
Figure 35:
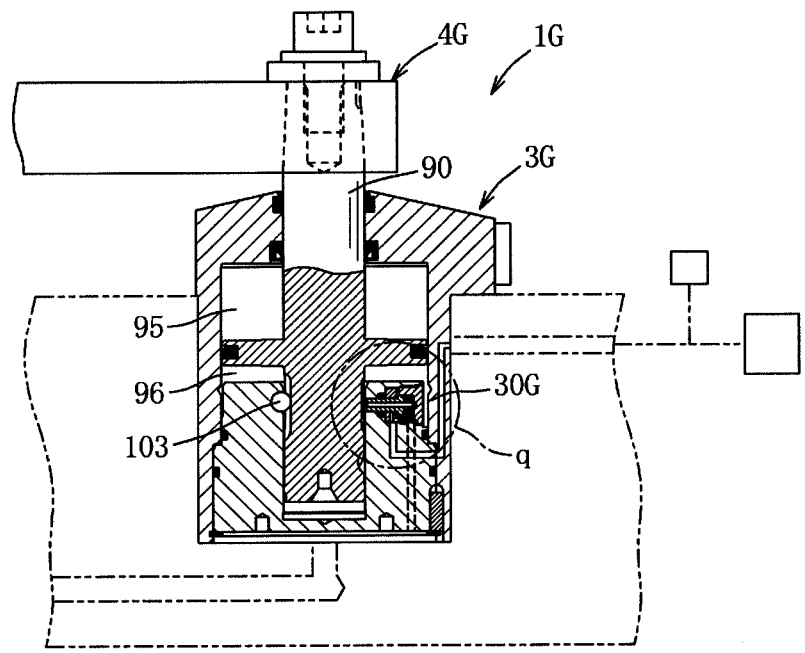
FIG. 35 is a sectional view of the clamp device (the clamped state) according to the eighth embodiment.

As shown in FIG. 34, when the piston rod member 90 lowers in order to change over from the unclamped state to the clamped state, during the twisting operation of the piston rod member 90, since the end portion of the valve body main portion 38 projects to within the helical groove 102b, accordingly the annular valve surface 38c and the annular valve seat 37b contact one another and the valve closed state is established, so that the pressure of the air in the air supply passage that supplies pressurized air to the air passage 23 is kept at high pressure.

Figure 36:
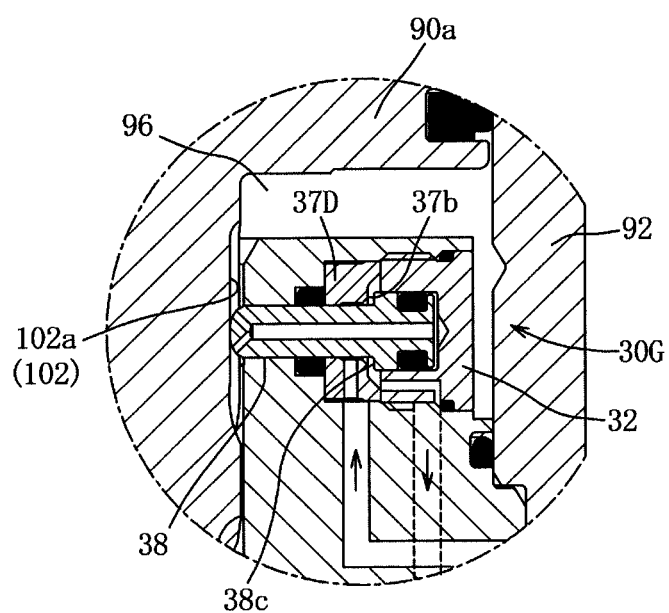
FIG. 36 is an enlarged view of a portion "q" of FIG. 35.

By contrast, as shown in FIG. 36, after the piston rod member 90 has completed its twisting operation, the end portion of the valve body main portion 38 is in the state of being engaged into the straight groove 102a. Since, when this occurs, the valve body main portion 38 is shifted to press against the cap member 32 and the annular valve surface 38c comes into the state of being removed away from the annular valve seat 37b, and the valve open state is established, accordingly the pressure of the air in the air supply passage that supplies pressurized air to the air passage 23 drops. Due to this, it is possible reliably to detect the twist operation completed position of the piston rod member 90 on the basis of the signal from the pressure switch. Apart from the above, similar beneficial effects are obtained to those obtained in the case of the hydraulic pressure cylinder of the first embodiment.

Examples in which the above embodiments are partially altered will now be explained.

1) It would also be possible to provide a single pressure switch or pressure sensor in common for a plurality of air supply passages that supply pressurized air to a plurality of air passages in a plurality of opening/closing valve mechanisms.

2) While, in the explanation of the embodiments described above, it was supposed by way of example that the fluid pressure cylinders were hydraulic pressure cylinders, it would also be possible to apply the present invention to fluid pressure cylinders that are air cylinders, in a similar manner to that described above.

3) The shown constructions for the cylinder main bodies and for the piston rod members and so on have only been given by way of example; provided that the gist of the present invention is preserved, various changes and additions to these constructions may be implemented.

4) The various constructions shown above for various opening/closing valve mechanisms are only given by way of example, and the present invention is not to be conceived as being limited to these opening/closing valve mechanisms; rather, provided that the gist of the present invention is preserved, the present invention may employ opening/closing valve mechanisms of various types.

INDUSTRIAL APPLICABILITY

The fluid pressure cylinder according to the present invention can be employed as a hydraulic pressure cylinder or an air cylinder that is applied to a clamp device or to some other mechanical device or the like.

DESCRIPTION OF NUMERALS 1, 1D, 1F, 1G: clamp device
10, 70, 92: cylinder main body
3, 3E, 3F, 3G: hydraulic pressure cylinder
4, 4F, 4G, 73: output member
14, 74, 95: clamping hydraulic chamber
15, 75, 96: unclamping hydraulic chamber
21, 22, 23, 24: air passage
30, 30D, 30G, 50, 50A: opening/closing valve mechanism
50B, 50C, 50D, 50F, 76: opening/closing valve mechanism
31, 31D, 51, 51B, 51C, 80: valve body
32a, 37b, 52a, 57b, 81a: valve seat
33, 53, 82: hydraulic pressure introduction chamber
34, 54, 83: hydraulic pressure introduction passage
36, 72a, 56: installation hole
32, 52, 52C, 79: cap member
42, 62: seal member
53a: compression coil spring

The invention claimed is:

1. A fluid pressure cylinder comprising a cylinder main body, an output member that is fitted so as to be movable forward and backward within the cylinder main body, a fluid chamber for driving the output member to either advance or retract,
   an air passage that is formed within the cylinder main body with pressurized air being supplied to its one end portion while its other end portion is communicated to an exterior, and an opening/closing valve mechanism capable of opening and closing the air passage;
   wherein the opening/closing valve mechanism comprises a valve body that is installed in an installation hole formed in the cylinder main body so as to be movable forward and backward, a fluid pressure introduction chamber that keeps the valve body in an advanced state toward the output member by means of fluid pressure in the fluid chamber, and a fluid pressure introduction passage that is formed so as to pierce said valve body and that communicates together the fluid chamber and the fluid pressure introduction chamber;
   wherein an end portion of the valve body projects into the fluid chamber, and
   wherein, by means of changing over the open or closed state of the opening/closing valve mechanism by the valve body being shifted by the output member when the output member is at a prescribed position, it is possible to detect that the output member has arrived at the prescribed position on the basis of the pressure of the air in the air passage.

2. The fluid pressure cylinder according to claim 1, whereby
   in the state in which fluid pressure is supplied to the fluid chamber, the opening/closing valve mechanism maintains the valve open state; and
   when the fluid pressure in the fluid chamber is changed over to drain pressure and also the output member has arrived at the prescribed position, the opening/closing valve mechanism changes over to the valve closed state.

3. The fluid pressure cylinder according to claim 1, wherein
   when fluid pressure is supplied to the fluid chamber, the opening/closing valve mechanism maintains the valve closed state; and when the fluid pressure in the fluid chamber is changed over to drain pressure and also the output member has arrived at the prescribed position, the opening/closing valve mechanism changes over to the valve open state.

4. The fluid pressure cylinder according to claim 2, wherein
the opening/closing valve mechanism comprises a cap member that is inserted into the installation hole formed in the cylinder main body and is screwingly engaged thereinto, and into which the valve body is inserted so as to be movable forward and backward;
a valve seat is formed on the cap member in an end portion thereof towards the output member; and
the fluid pressure introduction chamber is defined between the cap member and the valve body.

5. The fluid pressure cylinder according to claim 4, wherein the valve body comprises a valve body main portion and a movable valve body that is installed with being fitted over the valve body main portion capable of approaching toward and removing away from the valve seat, and a seal member is provided between the valve body main portion and the movable valve body.

6. The fluid pressure cylinder according to claim 1, wherein the fluid pressure introduction passage of the opening/closing valve mechanism is formed so as to pierce the valve body.

7. The fluid pressure cylinder according to claim 1, wherein the opening/closing valve mechanism comprises an elastic member that elastically biases the valve body towards the output member.

8. The fluid pressure cylinder according to claim 1, wherein the prescribed position of the output member is one of a raised limit position, an intermediate operating position, and a lowered limit position.

* * * * *